US010373782B2

(12) United States Patent
Ruff

(10) Patent No.: US 10,373,782 B2
(45) Date of Patent: Aug. 6, 2019

(54) SWITCHING DEVICE FOR A RADIO PUSHBUTTON, RADIO PUSHBUTTON, AND METHOD FOR GENERATING A SWITCHING SIGNAL OF A RADIO PUSHBUTTON

(71) Applicant: ZF Friedrichshafen AG, Friedrichshafen (DE)

(72) Inventor: Eduard Ruff, Auerbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 250 days.

(21) Appl. No.: 15/310,992

(22) PCT Filed: Apr. 15, 2015

(86) PCT No.: PCT/EP2015/058157

§ 371 (c)(1),
(2) Date: Nov. 14, 2016

(87) PCT Pub. No.: WO2015/172958

PCT Pub. Date: Nov. 19, 2015

(65) Prior Publication Data

US 2017/0076888 A1 Mar. 16, 2017

(30) Foreign Application Priority Data

May 15, 2014 (DE) ........................ 10 2014 209 192

(51) Int. Cl.

| | |
|---|---|
| ***H01H 23/14*** | (2006.01) |
| ***H02K 35/00*** | (2006.01) |
| *H01H 9/16* | (2006.01) |

(52) U.S. Cl.

CPC ........... *H01H 23/143* (2013.01); *H02K 35/00* (2013.01); *H01H 9/168* (2013.01);

(Continued)

(58) Field of Classification Search

CPC ........... H01H 9/00; H01H 25/06; H02J 13/00; H02K 35/00; H02K 35/02

(Continued)

(56) References Cited

U.S. PATENT DOCUMENTS 6,272,073 B1 * 8/2001 Doucette ................ H04B 11/00 134/127
6,617,535 B2 * 9/2003 Lacroix .................. H01H 23/16 200/315

(Continued)

FOREIGN PATENT DOCUMENTS

DE 202004005837 U1 8/2004
DE 102010003152 A1 9/2011

(Continued)

OTHER PUBLICATIONS

German Office Action dated Apr. 2, 2015 for German Patent Application No. DE 10 2014 209 192.6 (German language), 7 pages.

(Continued)

*Primary Examiner* — Fritz M Fleming
*Assistant Examiner* — Jagdeep S Dhillon
(74) *Attorney, Agent, or Firm* — Brinks Gilson & Lione

(57) ABSTRACT

Provision is made for a switching device for a wireless switch. The switching device comprises actuating means for receiving a mechanical energy, which can be introduced during a switching operation into the switching device. Furthermore, the switching device with the actuating means and with an energy conversion device comprises mechanically connectible switching means for transmitting the mechanical energy from the actuating means to the energy conversion device, in order to convert the mechanical energy to an electrical energy for transmitting a switching signal. At the same time, the switching means are designed to be (Continued)

actuated during a switching operation by means of the actuating means, in order to transfer, when connected with the energy conversion device, the energy conversion device at least from a first stable condition to a second stable condition, which is different from the first stable condition, in order to produce at least one electrical energy impulse.

19 Claims, 14 Drawing Sheets

(52) U.S. Cl.
CPC ... *H01H 2239/076* (2013.01); *H01H 2300/03* (2013.01); *Y02B 90/224* (2013.01); *Y04S 20/14* (2013.01)

(58) Field of Classification Search
USPC ......... 307/143, 139, 112, 115, 116, 25, 108; 341/20
See application file for complete search history.

(56) References Cited

U.S. PATENT DOCUMENTS 6,630,894 B1 * 10/2003 Boyd .................. H03K 17/964 310/311
2003/0193417 A1 * 10/2003 Face .................... H03K 17/964 341/22
2014/0088917 A1 * 3/2014 Gasparini ........... G01C 22/006 702/160
2014/0353135 A1 * 12/2014 Erdmann .............. H01H 25/06 200/518

FOREIGN PATENT DOCUMENTS

| | | | | | |
|---|---|---|---|---|---|
| DE | 102010028623 | A1 | | 11/2011 | |
| DE | 102011076191 | A1 | | 11/2012 | |
| DE | 202012008994 | U1 | | 2/2014 | |
| EP | 2747111 | A1 | | 6/2014 | |
| WO | WO 9628873 | A1 | * | 9/1996 | .......... H02J 13/0006 |
| WO | WO9628873 | A1 | * | 9/1996 | .......... H02J 13/0006 |
| WO | WO 2007136359 | A1 | * | 11/2007 | ............... H01F 7/06 |
| WO | WO-2007136359 | A1 | * | 11/2007 | ............... H01F 7/06 |
| WO | WO2013053565 | A1 | | 4/2013 | |

OTHER PUBLICATIONS

English translation of p. 7 of German Office Action dated Apr. 2, 2015 for German Patent Application No. De 10 2014 209 192.6 (2 pages).
International Search Report and Written Opinion dated Jul. 3, 2015 for PCT/EP2015/058157 (German language, 11 pages).
International Search Report dated Jul. 3, 2015 for PCT/EP2015/058157 (English language, 3 pages).

* cited by examiner

SWITCHING DEVICE FOR A RADIO PUSHBUTTON, RADIO PUSHBUTTON, AND METHOD FOR GENERATING A SWITCHING SIGNAL OF A RADIO PUSHBUTTON

RELATED APPLICATIONS

This application is a filing under 35 U.S.C. § 371 of International Patent Application PCT/EP2015/058157, filed Apr. 15, 2015, and claims the priority of German Patent Application DE 10 2014 209 192.6, filed May 15, 2014, both of which are incorporated by reference herein in their entirety.

BACKGROUND

1. Technical Field

The present invention relates to a switching device for a wireless switch, to a switch and to a method for producing a switching signal of a wireless switch, especially in the field of home technology for surface installation.

2. Background Information

In particular, wireless switches are used in home technology, for example, for an exposed solution. By means of the wireless switch, a plurality of consumers can be controlled by means of the switching signal, for example, illuminants, shutters and the like. DE 20 2004 005 837 U1 discloses a switch housing for surface installation and for receiving an electronic module.

Against this background, the present invention provides an improved switching device for a wireless switch, an improved wireless switch and an improved method for producing a switching signal of a wireless switch according to the main claims. Advantageous embodiments are depicted in the sub-claims and the subsequent description.

According to embodiments of the present invention, a switching device for a self-powered wireless switch can be provided for building technology, by means of which it is possible to produce a switching signal. In particular, depending on the embodiment, a switching mechanism or a so-called "toggle" mechanism of the switching device makes it possible that during a switching operation or actuation process merely one energy impulse can be produced or even two or multiple energy impulses can be produced. In a first embodiment and mounting option, the switching mechanism is designed to activate or actuate an energy converter in a switching operation merely one time, and in a second embodiment and mounting option to activate or actuate an energy converter in a switching operation, for example, two times.

BRIEF SUMMARY

The present invention relates to a switching device for a wireless switch, wherein the switching device comprises actuating means for receiving mechanical energy that can be applied during a switching operation to the switching device, wherein the switching device with the actuating means and an energy conversion device for converting the mechanical energy to electrical energy comprises mechanically connectable switching means for transmitting the mechanical energy from the actuating means to the energy conversion device, wherein the switching means are designed to be actuated during the switching process by means of the actuating means, in order to transfer, when connected with the energy conversion device, the energy conversion device at least from a first stable condition to a second stable condition, which is different from the first stable condition, to produce at least one electrical energy impulse.

The wireless switch can be designed to control by means of the switching signal at least one external device, by means of radio transmission of the switching signal. Furthermore, the wireless switch can be designed to be surface-mounted, for example, using building technology. The switching device could also be depicted as a switching module. The switching device can comprise mechanical components for activating or actuating the energy conversion device. In particular, the switching device can be designed to actuate or activate the energy conversion device in response to a switching operation or actuation process in which an external actuating force representing the mechanical energy is transmitted to the switching device. The energy conversion device can be designed to convert mechanical energy of the actuating force to electrical energy. The energy conversion device can also be designed in bistable fashion. Here, the energy conversion device can comprise the first stable condition and the second stable condition. The energy conversion device can be designed to perform an actuation motion between the first stable condition and the second stable condition by means of the mechanical energy transmitted by means of the actuating means and the switching means to the energy conversion device and to produce or generate in the process an electrical energy impulse. Here, the energy conversion device is designed to produce an electrical energy impulse in an actuation motion from the first stable condition to the second stable condition and to produce an electrical energy impulse in an actuation motion from the second stable condition to the first stable condition. The actuating means can involve at least a lever element, a lever, a double lever, a twin lever or the like. The switching means can be arranged or designed to be contacted mechanically by means of the actuating means. The switching means can also be mechanically connected with the energy conversion device. The switching means can be designed to transmit during a switching operation or actuation process the mechanical energy from the actuating means to the energy conversion device. The switching means can be designed to transfer when connected with the energy conversion device the energy conversion device from the first stable condition to the second stable condition and, in addition, or alternatively, from the second stable condition to the first stable condition.

According to embodiments of the present invention, the described approach can advantageously be used to implement a KNX-RF-capable switch or wireless pushbutton. Because of the switching mechanism, on the one hand, the energy converter can produce sufficient energy when actuating the switch and, on the other hand, an actuating force can be kept at the lowest possible level. Since, in most applications, it is sufficient to produce a single energy impulse, it is not required to produce unnecessary energy and it is not required to apply an unnecessary actuating force. Furthermore, an application in KNX-RF-radio networks is made possible, wherein a performance can be obtained independent from a battery or a connection to the power supply network. This allows for flexible application and low maintenance.

Furthermore, according to embodiments of the present invention, disadvantages of many customary switching devices or switching modules provided as switches for surface installation in building technology can be avoided, which, among other things, are designed in such a way that an actuation of respectively one of two movable levers is introduced, which activate an electromagnetic energy converter. Usually, such switching modules have a housing with a rigid design and require a certain amount of space below a button to avoid a collision when tilting the button. At the same time, one of, for example, four coding switches is actuated with a supplementary component of the button. During the actuation process, an energy impulse is generated and, depending on the already actuated coding switch, converted in an electronic module to a radio signal and transmitted by means of radio communication.

Such light switches are able to use an actuating mechanism in which, especially when actuating and releasing the button, inevitably a respective energy impulse is generated, wherein the energy impulse is, for example, rejected when releasing the button or it is used for a telegram repeat, which can be avoided with the switching mechanism according to embodiments of the present invention. As a result, it is possible to also avoid a problem, which involves that a performance of the energy converter to transmit KNX-RF telegrams has to be increased to the extent that the actuating forces and an operational noise would exceed acceptable values. Furthermore, according to embodiments of the present invention, it is also possible to avoid a double klick or double sound, which would further deteriorate the acoustic noise of the switch. In this way, it is also possible to avoid a two-way operating concept, which requires some getting used to and is not always well accepted on the market, and in which a button is placed, for example, in a central position to be pushed on the top and on the bottom. In most cases, a conventional button, which has its actuation point on the bottom, is desired.

In particular, the switching means of the switching device can comprise a movable carriage, which can be mechanically connected with the energy conversion device, and at least a carriage lever, which can be actuated by means of the actuating means. For this purpose, the at least one carriage lever can be designed to move the movable carriage between a first position, which is assigned to the first stable condition of the energy conversion device, and a second position, which is assigned to the second stable condition of the energy conversion device. Such an embodiment has the advantage that, by slightly adjusting the structure of the switching means, it is possible to perform a one-time or, in particular, two-time or repeated activation of the energy conversion device by switching operation or actuation process.

At the same time, the switching device can comprise at least one roller or sliding component, which can be mechanically connected with the movable carriage and, in addition, or alternatively, with the at least one carriage lever. Such an embodiment has the advantage that a movement of the carriage between the first position and the second position is facilitated and made more reliable. For example, the sliding component can involve a sliding plate with a sliding surface. Alternatively, it is possible to use a sliding block instead of a sliding plate. It is important that the sliding component has a sliding surface, by means of which the frictional resistance can reduced when the carriage makes a sliding movement. At the same time, the sliding surface can have optimal dimensions. In other words, a dimension of the sliding surface can be arbitrarily selected, depending on the desired reduced frictional resistance of the sliding movement. Preferably, the sliding surface can have a surface comprising a reduced frictional resistance.

According to one embodiment, the switching means can comprise elastic means, which are designed to have an effect on the movable carriage, in order to move the movable carriage from the second to the first position. For this purpose, the switching means can comprise the movable carriage, a carriage lever and the elastic means. At the same time, the actuating means can comprise a lever or single lever or a lever element. The carriage lever can be arranged and designed to be actuated because of the mechanical energy by the lever or single. In the process, the movable carriage can be moved by the actuated carriage lever from the first to the second position, wherein the elastic means can be compressed, wherein energy for a return movement of the respective carriage from the second position to the first position can be arranged in the elastic means. As a result, the switching means can be designed to cause the energy conversion device to produce two energy impulses during a switching operation. Such an embodiment has the advantage that a one-way module, in which the wireless switch is provided to perform a single actuation motion, can be implemented in an easy and cost-effective manner as an actuation concept with two impulses and a low actuating force and high yield of electrical energy.

Alternatively, the switching means can comprise elastic means and two carriage levers. At the same time, the elastic means can be designed to preload the carriage levers in a rest position, wherein the movable carriage is arranged between the carriage levers. Here, a first carriage lever can be designed to move the movable carriage from the first position to the second position, wherein a second carriage lever can be designed to move the movable carriage from the second position to the first position. At the same time, the actuating means can comprise a double lever or two levers or lever elements. The carriage lever can be arranged and designed in such a way that during a switching operation one of the carriage levers is actuated because of the mechanical energy by means of one of the levers of the actuating means. As a result, the switching means can be designed to cause the energy conversion device to produce during a switching operation only one electrical energy impulse. Such an embodiment has the advantage that a two-way module, in which the wireless switch is provided to perform different actuation motions, can be implemented in an easy and cost-effective manner as an actuation concept with a single impulse per switching operation and a low actuating force and high yield of electrical energy.

Furthermore, the switching device can comprise at least one return spring, which is designed to preload the actuating means in a rest position. The actuating means are designed to be arranged in the rest position in the absence of mechanical energy of a switching operation or in the absence of an actuating force. As a result, it is possible to provide for actuation processes a definite starting position.

The present invention also relates to a wireless switch with an embodiment of the previously mentioned switching device; an energy conversion device, which can be mechanically connected with the switching means of the switching device, in order to convert the mechanical energy, which can be introduced during the switching operation into the switching device, to electrical energy for transmitting the switching signal; a circuit carrier with a signal output device for transmitting the switching signal, wherein the circuit carrier can be connected in an electrically conductible manner with the energy conversion device; a housing with at least one housing element, wherein the housing is designed to receive the switching device, the energy conversion device and the circuit carrier; and a switch for transmitting the mechanical energy to the actuating means of the switching device, wherein the switch can be mounted on the housing.

In connection with the wireless switch, it is possible to advantageously use an embodiment of the above-mentioned switching device, in order to activate especially the energy conversion. The housing can be designed to allow the wireless switch to be mounted on the surface of a wall or any other surface in a building or the like. The circuit carrier can involve a circuit board, a printed circuit board, or the like. At the same time, the circuit carrier can be arranged between the energy conversion device and the switch. The signal output device can be applied to the circuit carrier by means of methods customary in semiconductor technology. The signal output device can comprise an antenna configuration, especially an antenna configuration that is printed on the circuit carrier. The signal output device can be designed to transmit the switching signal by means of radio communication to an interface to a control device and in addition, or alternatively, to at least one controllable device. An electrical contact between the circuit carrier and the energy conversion device can be implemented by means of SMD spring contacts formed on the circuit carrier, which can be connected in electrically conductible manner with a circuit board, which is soldered with contact points of the energy conversion device. Alternatively, the circuit carrier can comprise a coated metal grid with spring contacts. As a result, it is possible to eliminate the circuit board and the associated costs for soldering. This can involve another cost advantage and increase the reliability of the contact.

According to one embodiment, the signal output device can comprise radio electronics for producing and transmitting a radio signal. At the same time, the radio signal can fulfill the requirements of a pre-determined radio protocol. The circuit carrier can comprise at least one code contact, which can be actuated during the switching operation, in order to provide a code signal. For example, the code signal can be transmitted to the radio electronics, wherein the radio electronics is designed to produce and transmit based on the code signal a radio signal appropriate for a pre-determined radio protocol, wherein the radio signal can represent the information on which the code signal is based. The signal output device and the at least one code contact can be arranged at different main surfaces of the circuit carrier. In addition, the circuit carrier can comprise at least one electric circuit, which is electrically connected with the code contacts, the signal output device and the energy conversion device. For example, the radio electronics can be designed to be exchangeable. The circuit carrier with a first radio electronics can also be exchanged with a circuit carrier with a second radio electronics, which is different from the first radio electronics. When contacted by means of actuating means or a switch, the code contacts can be designed to allow for the provision of the code signal in a switching operation. For this purpose, the circuit carrier can comprise an electrical encoding circuit, which is electrically connected with the code contacts and designed to produce an individual code signal, depending on which of the code contacts is contacted by the actuating means or the switch. The code signal can represent information as to which of the code contacts is contacted by the actuating means or the switch. At the same time, the actuating means can be designed to actuate the switching means, while at least one of the code contacts is contacted. Such an embodiment has the advantage that, when exchanging the radio electronics, the wireless switch can be operated not only according to the KNX-RF-protocol, but also according to other radio protocols in different radio bands, for example, 868 MHz, 915 MHz, 2.4 GHz etc., and thus can be used in an extremely flexible manner.

In particular, the actuating means or the wireless switch for contacting the at least one code contact can comprise a switch membrane with a plurality of switch projections. The switch membrane can be formed from an elastically deformable material. The switch projections can be designed in the form of switching pills, switching lugs, or the like, and can be arranged on a main surface of the switch membrane. The switch membrane can be arranged between the switch and the circuit carrier. The switch or the actuating means can be designed to actuate in a switching operation the code contacts by means of the switch membrane. During a switching operation, the switch projections can be moved independently from one another or together to an encoding position. The arrangement and number of switch projections can correspond to the arrangement and number of code contacts.

The switch can also be designed in the form of a rocker, a double rocker or multiple rocker. Such an embodiment has the advantage that different operating concepts for devices to be switched in various ways can be implemented by selecting an appropriate switch or an appropriate variant of the switching means of the switching device.

Furthermore, the housing can be formed at least partially from a sound-decoupling material for reducing an operational noise. In addition, or alternatively, the wireless switch can comprise a sound-decoupling capsule for absorbing the sound of the energy conversion device. The sound-decoupling material can comprise a material having an elasticity that is higher than the elasticity of a housing material. As a result, the housing can comprise a two-component housing, consisting of a hard material and a soft material. The sound-decoupling capsule can be produced from the sound-decoupling material. For example, with regard to a vibration distribution, the energy conversion device can be insulated by means of a rubber capsule to form a sound-decoupling capsule of the housing parts. Such an embodiment has the advantage that a further reduction of the noise level can be achieved.

Furthermore, the present invention relates to a method for producing a switching signal of a wireless switch, wherein the method can be performed in connection with a wireless switch, which comprises an energy conversion device for converting mechanical energy to electrical energy and a circuit carrier with a signal output device, wherein the circuit carrier is connected in electrically conductible manner with the energy conversion device, wherein the method comprises the following steps: generating at least one electrical energy impulse for transmitting the switching signal by means of the switching device and the energy conversion device using a mechanical energy introduced during a switching operation into the switching device, wherein the mechanical energy is received by actuating means of the switching device and transmitted to the energy conversion device by means of switching means, which are mechanically connected with the actuating means and the energy conversion device, wherein the switching means are actuated during the switching operation by means of the actuating means, in order to transfer the energy conversion device at least from one first stable condition to a second stable condition, which is different from the first stable condition, for generating the at least one electrical impulse of the energy conversion device; and releasing the switching signal by means of radio communication by means of the signal output device, using the at least one electrical energy impulse.

Advantageously, the method can be performed for producing a switching signal in connection with above-mentioned wireless switch or in connection with the above-mentioned switching device.

Advantageously, according to embodiments of the present invention, for example, by using the switching device, the switch or pushbutton can be used in the KNX-RF radio network, because it allows for a high energy yield of the energy converter and a bidirectional radio operation. When actuated and in addition, or alternatively, when released, the wireless switch can produce a respective energy impulse and transmit a respective radio telegram. This variant can offer an advantage when used with a dimmer or for controlling roller blinds or shutters. In applications in which the second energy impulse and the second radio telegram is not required when releasing the switch, the switching device can be designed to merely produce an energy impulse and avoid unnecessary physical effort and disturbing noises when actuating and releasing the wireless switch. According to embodiments of the present invention, it is possible to achieve an improvement of acoustics, haptics and noise generation of the wireless switch.

As a result, it is possible according to embodiments of the present invention, to provide a self-powered switching module or self-powered wireless switch for universal use in the KNX-RF/KNX-RF-ready-network. It is possible to allow for the use of different or customer-specific radio protocols and free radio bands. It is also possible to minimize an actuating force and an operational noise and haptics, for example, designed analogous to wired light switches. The wireless switch can be suited for controlling light sources with dimmers and without dimmers, as well as for controlling shutter drives and roller blind drives. Furthermore, it is possible to allow for bidirectional radio operation, at least during a configuration or preparatory phase of the wireless switch. The switching device can be designed to be modified for two operating concepts, similar to a building block system or variant assembly kit, wherein an implementation for a two-way module or one-way module can be provided, wherein both concepts can be implemented with only moderate modifications. Thus, the device can be used with a simple pushbutton or double pushbutton or with a switch or double switch.

BRIEF DESCRIPTION OF THE DRAWINGS

The invention is explained in more detail and in an exemplary manner by means of the enclosed drawings. It is shown.

DETAILED DESCRIPTION OF THE DRAWINGS AND THE PRESENTLY PREFERRED EMBODIMENTS

Figure 1:
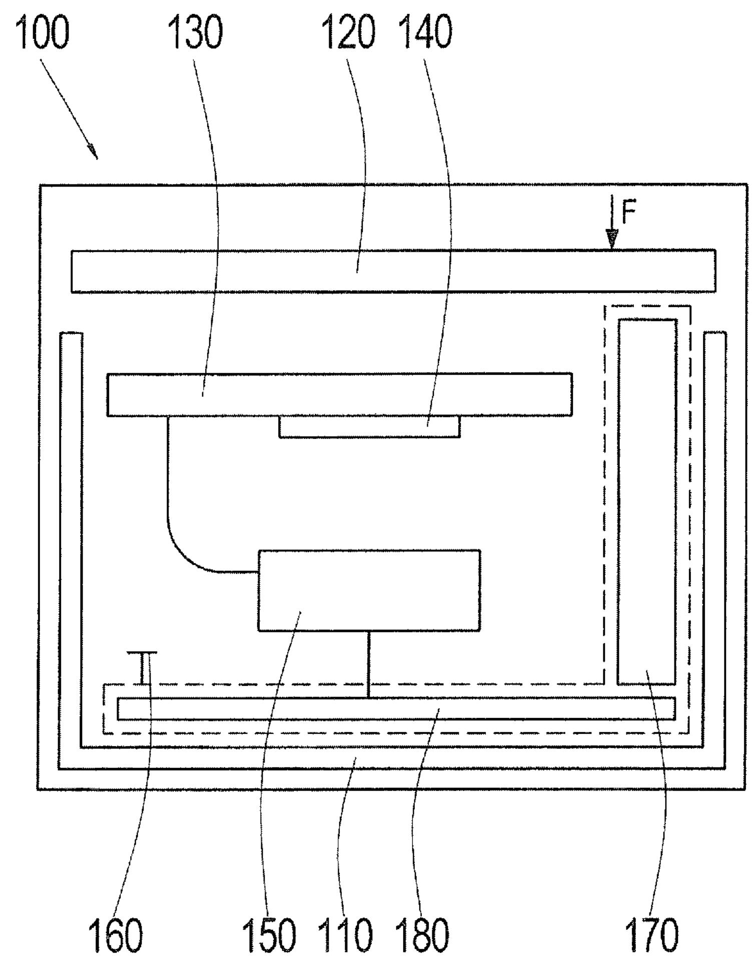
FIG. 1 is a diagram of a wireless switch according to an embodiment of the present invention.

In the subsequent description of preferred embodiments of the present invention, the same or similar reference numerals are used for the elements, which are shown in the different figures and which have a similar mode of action, thus refraining from repeating the description of these elements.

FIG. 1 shows a diagram of a wireless switch 100 according to an embodiment of the present invention. Here, FIG. 1 shows a housing 110 of the wireless switch 100, as well as a switch 120, a circuit carrier 130, a signal output device 140, an energy conversion device 150, a switching device 160, actuating means 170 and switching means 180. Furthermore, an actuating force F is symbolically represented by an arrow on the switch 120, wherein the actuating force F represents a mechanical energy during a switching operation.

According to the embodiment of the present invention shown in FIG. 1, the housing 110 comprises a housing element. According to a different embodiment, the housing 110 can also comprise two or more housing elements. The circuit carrier 130, the signal output device 140, the energy conversion device 150 and the switching device 160 are received in the housing 110. At the same time, the signal output device 140 is arranged on the circuit carrier 130. The switching device 160 comprises the actuating means 170 and the switching means 180.

The switch 120 can be mounted on the housing 110 or is attached to the housing 110 when the wireless switch 100 is operating, although this is not explicitly shown in FIG. 1. The switch 120 is arranged to be moved by means of the actuating force F, in order to contact the actuating means 170 of the switching device 160 and to transmit mechanical energy. The switch 120 is designed to transmit mechanical energy of the actuating force F to the actuating means 170 of the switching device 160.

The actuating means 170 of the switching device 160 are designed to receive mechanical energy, which can be introduced by means of the switch 120 to the switching device 160 during a switching operation. Furthermore, the actuating means 170 are arranged and designed to actuate the switching means 180 in response to the mechanical energy received. The switching means 180 can be mechanically connected with the actuating means 170 or can be actuated by means of the actuating means 170. Furthermore, the switching means 180 are mechanically connected with the energy conversion device 150. The switching means 180 are designed to transmit the mechanical energy from the actuating means 170 to the energy conversion device 150.

The energy conversion device 150 is mechanically connected with the switching means 180 of the switching device 160. Furthermore, the energy conversion device 150 is designed to convert the mechanical energy to be introduced to the switching device 160 during a switching operation to an electrical energy for transmitting a switching signal.

The switching means 180 are designed to be actuated during a switching operation by means of the actuating means 170 for transferring the energy conversion device 150 at least from one stable condition to a second stable condition, which is different from the first stable condition, in order to produce at least one electrical energy impulse.

The circuit carrier 130 with the signal output device 140 is arranged between the energy conversion device 150 and the switch 120. The circuit carrier 130 is connected in electrically conductible manner with the energy conversion device 150. The signal output device 140 is arranged on a main surface of the circuit carrier 130 facing the energy conversion device 150. At the same time, the signal output device 140 is designed to transmit or release the switching signal.

According to one embodiment, the switching means 180 of the switching device 160 can comprise a movable carriage, which is mechanically connected with the energy conversion device 150 and at least one carriage lever, which can be actuated by means of the actuating means 170. At the same time, the at least one carriage lever can be designed to move the movable carriage between a first position, which is assigned to the first stable condition of the energy conversion device 150, and a second position, which is assigned to the second stable condition of the energy conversion device 150. In addition, the switching means 180 can comprise at least a roller, which can be mechanically connected with the movable carriage and, in addition, or alternatively, with the at least one carriage lever. In a variant, the switching means 180 can comprise elastic means, which can be designed to exert an effect on the movable carriage, in order to move the movable carriage from the second position to the first position. In a further variant, the switching means 180 can comprise elastic means and two carriage levers. For this purpose, the elastic means can be designed to preload the carriage lever in a rest position, wherein the movable carriage can be arranged between the carriage levers. A first carriage lever can be designed to move the movable carriage from the first position to the second position, wherein a second carriage lever can be designed to move the movable carriage from the second position to the first position.

According to one embodiment, the signal output device 140 can comprise exchangeable radio electronics. Furthermore, according to one embodiment, the circuit carrier 130 can comprise at least one code contact, which can be actuated during the switching operation, in order to provide a code signal. Optionally, the switch 120 can be designed in the form of a rocker, a double rocker or multiple rocker. Furthermore, according to one embodiment, the housing 110 can be formed at least partially from a sound-decoupling material for reducing an operational noise. In addition, or alternatively, the wireless switch 100 can comprise a sound-decoupling capsule for absorbing the sound of the energy conversion device 150.

Figure 2:
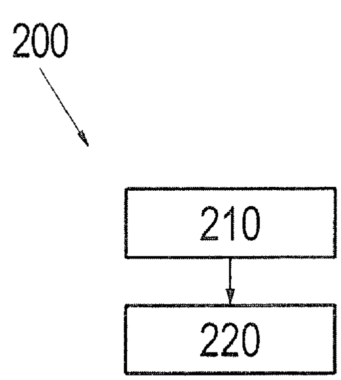
FIG. 2 is a flow diagram of a method for producing a switching signal according to an embodiment of the present invention.

FIG. 2 shows a flow diagram of a method 200 for producing a switching signal of a wireless switch according to an embodiment of the present invention. At the same time, the method 200 can be performed in connection with a wireless switch, which comprises a switching device, an energy conversion device for converting mechanical energy to electrical energy and a circuit carrier, which has signal output device and which is connected in electrically conductible manner with the energy conversion device. In particular, the method 200 can be performed in connection with the wireless switch shown in FIG. 1, FIG. 3, FIG. 4, FIG. 6, FIGS. 9A to 9E, FIG. 10, FIG. 11 and/or FIGS. 12A to 12D.

The method 200 comprises a step 210 of generating at least one electrical energy impulse for transmitting the switching signal by means of the switching device and the energy conversion device, using a mechanical energy introduced into the switching device during a switching operation. For this purpose, the mechanical energy is received by actuating means of the switching device and transmitted to the energy conversion device by switching means, which are mechanically connected with the actuating means and with the energy conversion device. At the same time, the switching means are actuated by means of the actuating means during the switching operation, in order to transfer the energy conversion device from a first stable condition to a second stable condition, which is different from the first stable condition, for generating the at least one electrical energy impulse. In addition, the method 200 comprises a step 220 of releasing the switching signal by means of radio communication by means of the signal output device, using the at least one electrical energy impulse.

Figure 3:
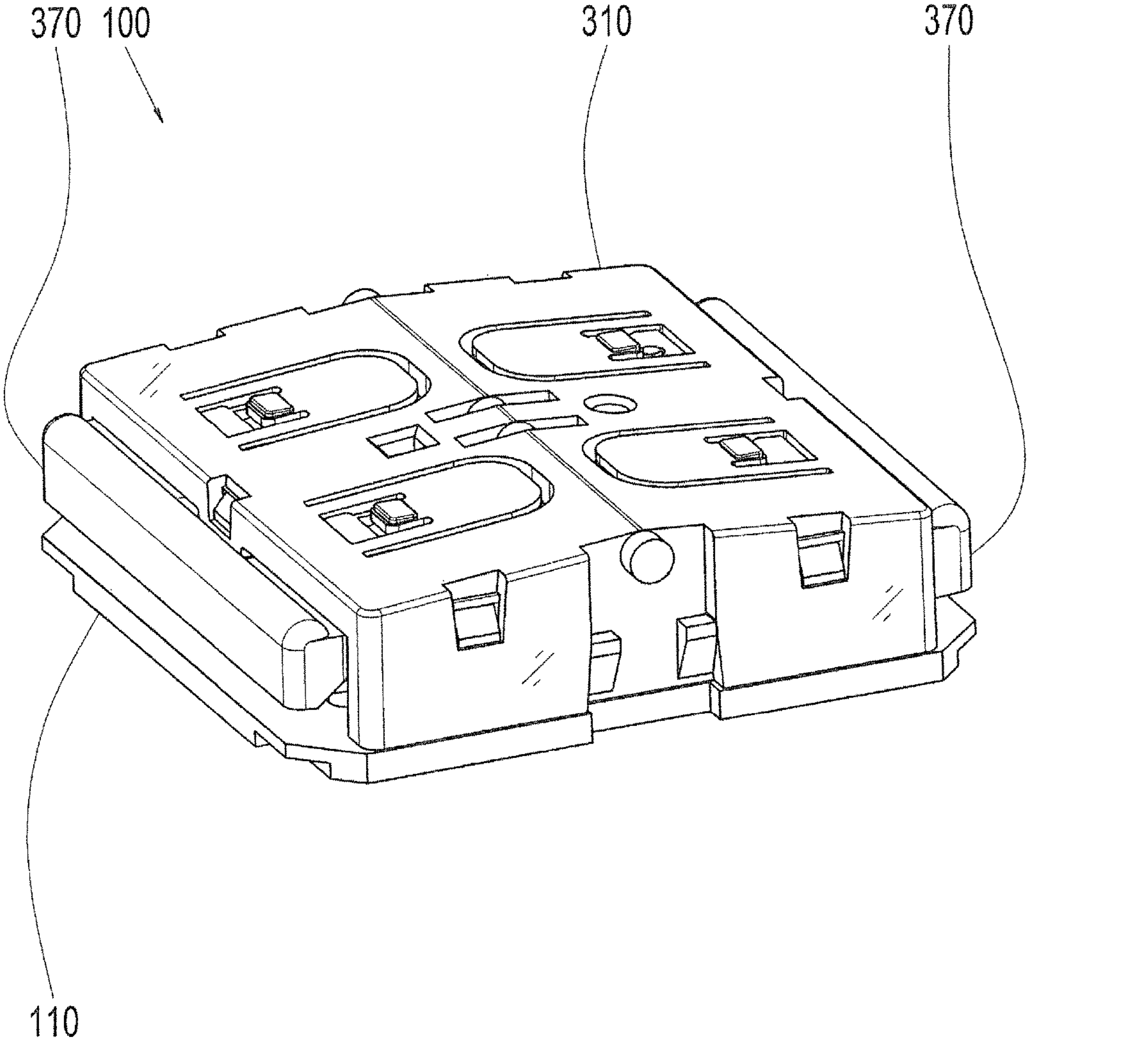
FIG. 3 is a perspective representation of a wireless switch according to an embodiment of the resent invention.

FIG. 3 shows a perspective view of a wireless switch 100 according to an embodiment of the present invention. The parts from the wireless switch 100 shown include a housing 110 or housing base, a cover 310 or housing cover and two actuating levers 370. The wireless switch 100 involves a wireless switch such as the one shown FIG. 1, wherein the wireless switch 100 shown in FIG. 3 is represented without the button, but with the cover 310, wherein the actuating levers 370 represent the actuating means. For this purpose, the wireless switch 100 is shown in an assembled condition but without the button. The overall housing of the wireless switch 100 comprises two housing elements, the housing 110 and the cover 310. The actuating levers 370 partially protrude from the housing 110 and the cover 310. The actuating means are designed in the form of actuating levers 370.

Figure 4:
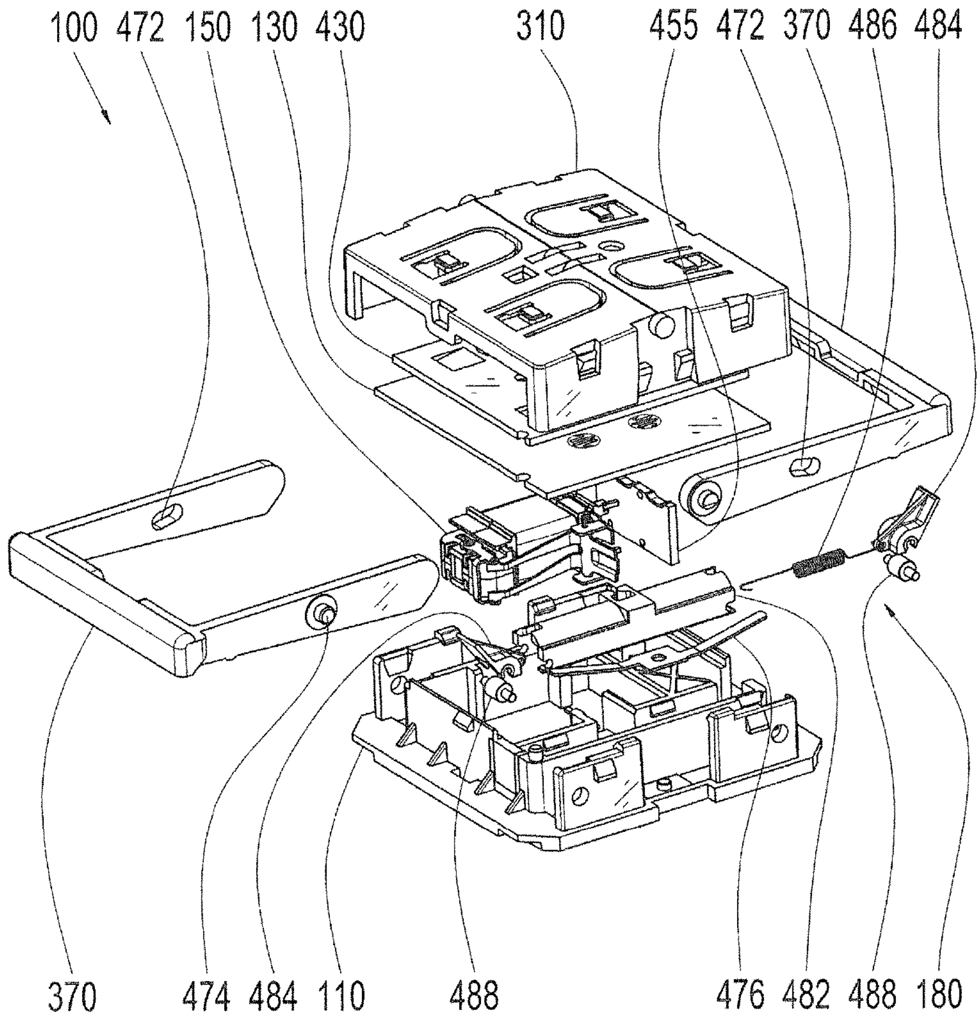
FIG. 4 is a perspective view of an exploded diagram of the wireless switch shown in FIG. 3.

FIG. 4 shows a perspective view of an exploded diagram of the wireless switch shown in FIG. 3. The parts from the wireless switch 100 shown include the housing 110, the circuit carrier 130, the energy conversion device 150 or a bistable energy converter, the switching means 180, the cover 310, actuating means in the form of two actuating levers 370 or a twin lever, a pressure-sensitive mat or switch membrane 430, a contact plate or an auxiliary circuit board 455, two elongated holes 472, due to display limitations, only one of two pins 474, a return spring 476, a movable carriage 482, two carriage levers 484, a tension spring 486 and two rollers 488.

The actuating levers 370 can be mounted on the housing 110. Each of the actuating levers 370 comprises an elongated hole 472 and a pin 474. Due to display limitations, only one of the pins 474 is visible in FIG. 4. The actuating levers 370 function as a twin lever. Furthermore, the actuating means comprise the return spring 476. The return spring 476 is designed to place the actuating lever 370 in a rest position and exert, during a switching operation, a counterforce against an actuating force on the actuating lever 370. As a result, the actuating means comprise the actuating levers 370 with the elongated holes 472 and the pins 474 and the return spring 476.

The switch membrane 430 is arranged between the cover 310 and the circuit carrier 130. The auxiliary circuit board 455 can be electrically and mechanically connected with the energy conversion device 150 and is arranged adjacent to the energy conversion device 150. By means of the auxiliary circuit board 455, the energy conversion device 150 can be connected in electrically conductible manner with the circuit carrier 130.

The switching means 180 comprise the movable carriage 482, the carriage lever 484, the tension spring 486 and the roller 488. Each carriage lever 484 can be provided with a roller 488. The movable carriage 482 is arranged between the carriage levers 484. The carriage levers 484 can be attached on the opposite ends of the movable carriage 482. The tension spring 486 can be mechanically connected with the carriage levers 484. At the same time, the tension spring 486 can be received in the movable carriage 482.

The energy conversion device 150 with the auxiliary circuit board 455, the return spring 476 and the switching means 180 are arranged between the circuit carrier 130 and a base portion of the housing 110 facing away from the cover 310.

The housing 110 and the cover 310 can be produced from plastic material by means of injection molding and can be designed for a simple injection tool construction. In particular, it is possible to use a soft, noise-absorbing plastic material, in order to minimize a noise transmission from the energy conversion device 150 to other switch components of the wireless switch 100.

The actuating levers 370 or a so-called twin lever are used as actuating means. Both actuating levers 370 are designed in such a way that two equally molded parts are used. As a result, it is possible to lower the costs for tools and parts. The actuating levers 370 can be configured as a lever assembly and pivoted n the housing 110. For this purpose, the actuating levers 370 can be connected with one another by means of elongated holes 472 and pins 474, wherein both actuating levers 370 can be set in motion, as soon as one of the two actuating levers is actuated or activated by means of the actuating force. The actuating levers 370 are reset by means of the return spring 476. It is possible to use a compression spring, tension spring, torsion spring or a flexible spring as return spring 476. In FIG. 4, the return spring 476 is shown in the form of a punched flexible spring. A spring force of the return spring 476 can be selected in such a way that the actuating levers 370 and the switch can be reset in a reliable manner.

The switching means 180 in the form of a so-called toggle mechanism are functionally toggled between the actuating means or the actuating levers 370 and the energy conversion device 150. In particular, the switching means 180 comprise the movable carriage 482, which can be received in the housing 110 with bush bearings or rolling bearings and which can be mechanically connected with an actuator of h energy conversion device 150.

For example, the cover 310 is produced from a noise-absorbing plastic material. The housing 110 can be closed by means of a cover 310. The cover 310 comprises mounting elements and a pivot bearing or pivot pins for a switch. The circuit carrier 130 comprises an electric circuit for energy management, as well as the signal output device with radio electronics and an antenna (not explicitly shown in FIG. 4). The wireless switch 100 can be operated by means of a rocker, two rockers or multiple rockers.

In other words, FIG. 4 shows a wireless switch 100, which is designed in the form of a two-way module, which generates when actuated or during a switching operation only at least one electrical energy impulse and thus transmits a telegram of switching signal. Here, it is possible to save actuating forces and lower a noise lever. A reset of the switch takes place without producing energy or a radio telegram, and thus at a low noise level or subjectively noiseless for the user. When actuating a rocker of the switch, the bistable energy conversion device 150 is activated in one direction. When repeating the actuation of the same or any other rocker of the switch, the energy conversion device 150 is activated in the other direction.

Figure 5:
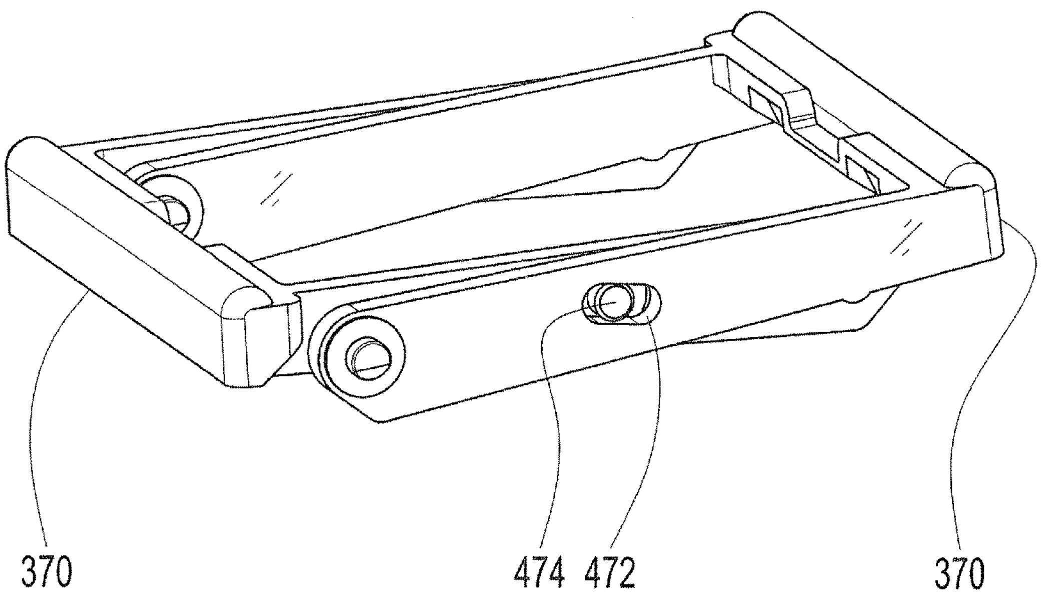
FIG. 5 is a perspective view of actuating means of the switching device of the wireless switch shown in FIG. 3 and FIG. 4.

FIG. 5 shows a perspective view of actuating means of the switching device of the wireless switch shown in FIG. 3 and FIG. 4. What is shown includes the actuating lever 370 and, due to display limitations, only one elongated hole 472 and one pin 474. The two actuating levers 370 shown are joined together to form a twin lever assembly. The pin 474 of the first actuating lever 370 is arranged in the elongated hole 472 of the second actuating lever 370. Furthermore, the pin 474 of the second actuating lever 370 is arranged in the elongated hole 472 of the first actuating lever 370 (not explicitly shown in FIG. 5).

Figure 6:
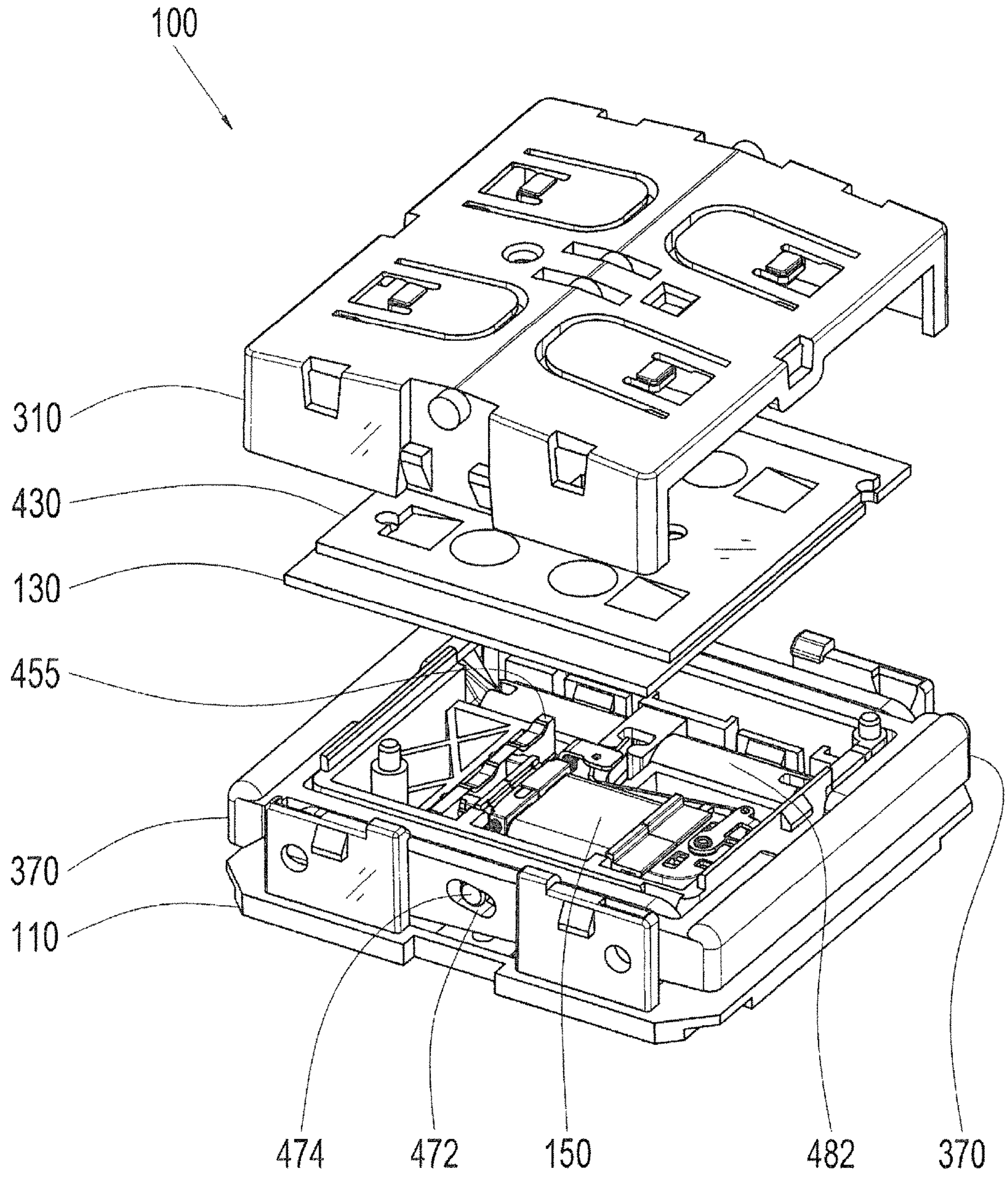
FIG. 6 is a perspective view of a partial exploded diagram of the wireless switch shown in FIG. 3 and FIG. 4.

FIG. 6 shows a view of a partial exploded diagram of the wireless switch 100 shown in FIG. 3 and FIG. 4. In other words, the wireless switch 100 is shown in a partially assembled condition. The parts from the wireless switch 100 shown in FIG. 6 include the housing 110, the circuit carrier 130, the energy conversion device 150, the cover 310, the actuating lever 370, the switch membrane 430, the auxiliary circuit board 455, an elongated hole 472, a pin 474 and the movable carriage 482.

In the representation of FIG. 6, the actuating lever 370 is assembled, as shown in FIG. 5 and attached to the housing 110. Furthermore, the energy conversion device 150 and auxiliary circuit board 455 are connected with one another and arranged in the housing 110. Furthermore, the switching means of which only the movable carriage 482 is shown in FIG. 6, are also arranged in the housing 110. The circuit carrier 130, the switch membrane 430 and the cover 310 are shown at a distance from the housing 110 and, with regard to the housing 110, they are shown in unmounted condition.

Figure 7:
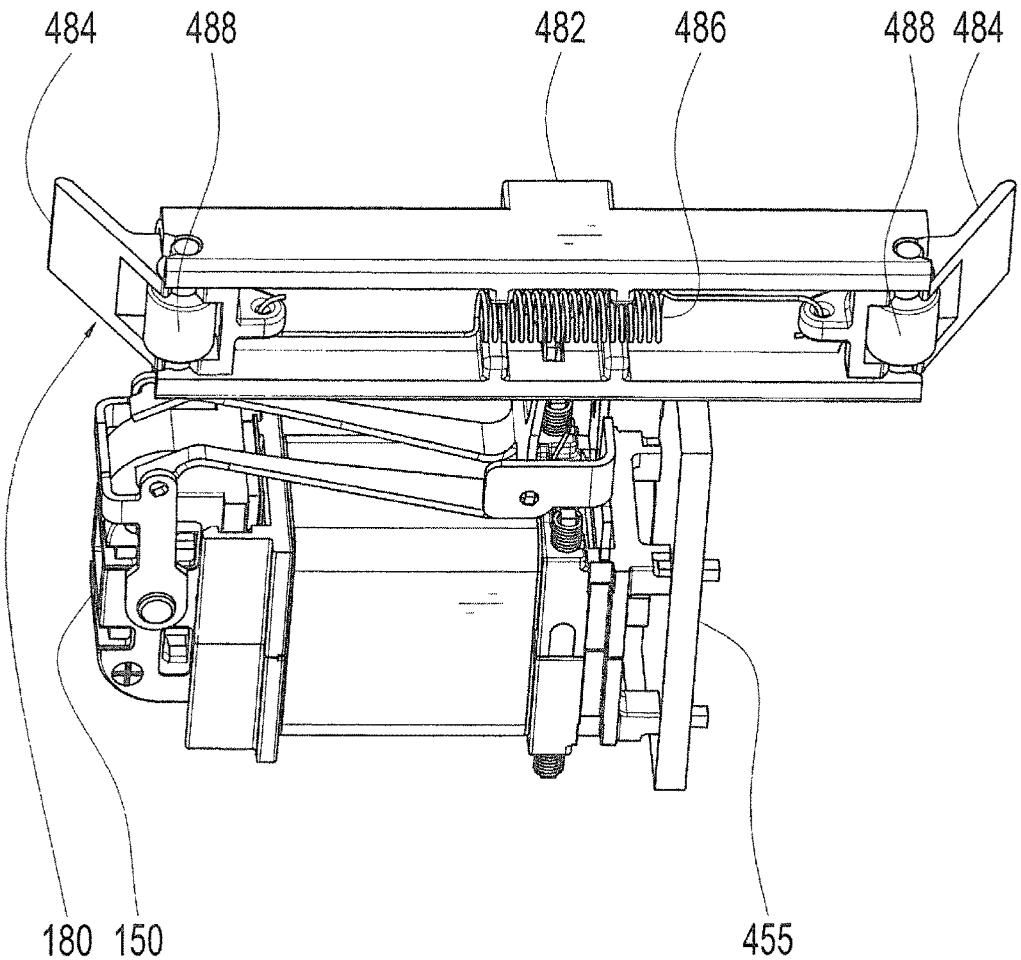
FIG. 7 is a perspective view of an energy conversion device and of switching means of the switching device of the wireless switch shown in FIG. 3, FIG. 4 and FIG. 6.

FIG. 7 shows a perspective view of the energy conversion device 150, and the switching means 180 of the switching device of the wireless switch shown in FIG. 3, FIG. 4 and FIG. 6. The parts shown in FIG. 7 include the energy conversion device 150, the switching means 180, the auxiliary circuit board 455, the movable carriage 482, the carriage lever 484, the tension spring 486 and the rollers 488.

In the representation shown in FIG. 7, the auxiliary circuit board 455 is electrically and mechanically connected with the energy conversion device 150. Furthermore, the energy conversion device 150 is mechanically connected with the movable carriage 482. The switching means 180 are shown in an assembled condition. Here, the carriage levers 484 are attached on opposite ends of the movable carriage 482. To each of the carriage levers 484, one of the rollers 488 is attached. The tension spring 486 is tightened between the carriage levers 484. The tension spring 486 extends in a hollow space of the movable carriage 482. The carriage levers 484 are preloaded in a rest position by means of the tension spring 486. During a switching operation, the switching means 180, especially the movable carriage 482, can be moved or displaced between a first position and a second position, in relation to the energy conversion device 150.

Figure 8:
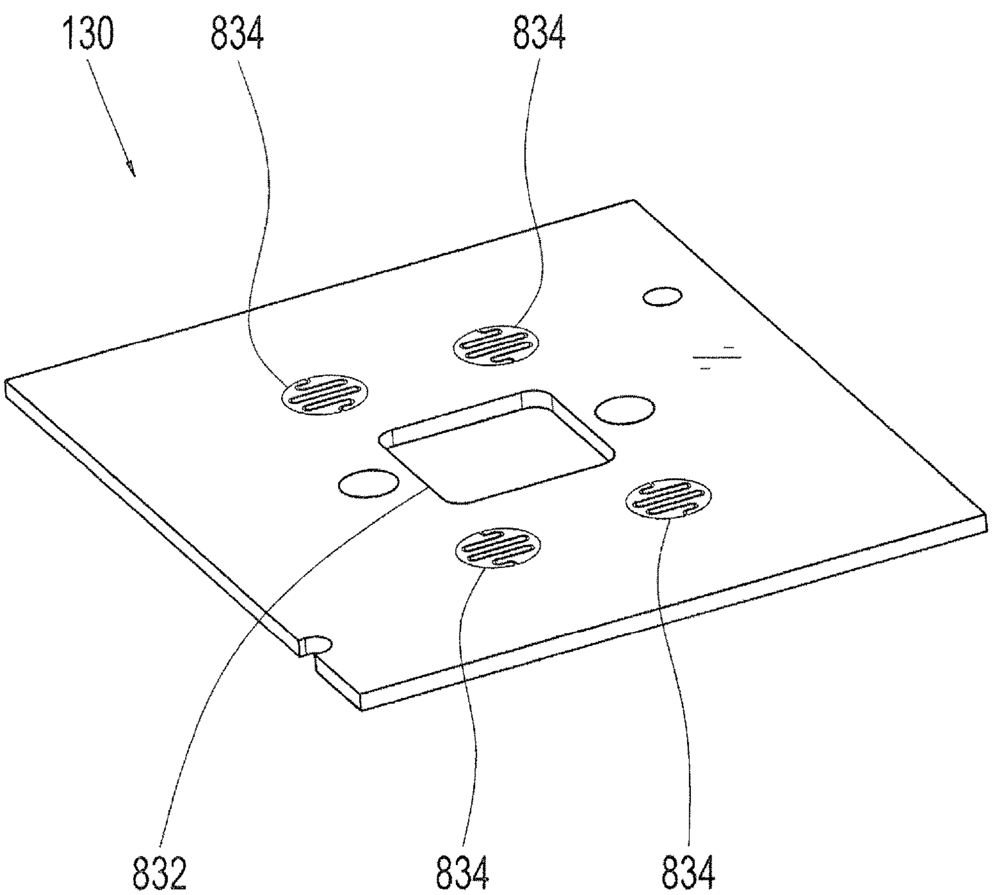
FIG. 8 is a perspective view of a circuit carrier of the wireless switch shown in FIG. 3, FIG. 4 and FIG. 6.

FIG. 8 shows a perspective view of the circuit carrier 130 of the wireless switch shown in FIG. 3, FIG. 4 and FIG. 6. More precisely, from the circuit carrier 130 shown in FIG. 8 in particular a main surface is depicted, which, when the circuit carrier 130 is mounted in the wireless switch, faces the switch membrane or the cover. Here, the circuit carrier 130 is shown to have, for example, a through-hole 832 arranged in the center and, for example, four code contacts 834. The code contacts 834 are positioned at corners of an imaginary rectangle on the main surface of the circuit carrier 130 shown in FIG. 8.

On a main surface of the circuit carrier 130, which faces in mounted condition the energy conversion device, the circuit carrier 130 can be provided with electronic components (not shown in FIG. 8). On the main surface of the circuit carrier 130 shown in FIG. 8, the code contacts 834 or coding switches or contact surfaces and contacts are arranged and an antenna can be imprinted. The code contacts 834 and their number can be freely adapted. For example, it is possible to use micro switches, pressure-sensitive mats, membrane switches, etc. The cover of the wireless switch comprises actuating elements for activating the code contacts 834.

FIGS. 9A to 9E show sectional views of the wireless switch 100 shown in FIG. 3, FIG. 4 and FIG. 6 in different conditions during switching operations. Here, the wireless switch 100 is shown in different switching phases and in assembled and mounted condition. FIGS. 9A to 9E respectively show from the wireless switch 100 the housing 110, the circuit carrier 130, the energy conversion device 150, the cover 310, the actuating lever 370, the switch membrane 430, the auxiliary circuit board 455, the movable carriage 482, the carriage levers 484, the tension spring 486, the rollers 488 and two bearing notches 978. One bearing notch 978 is formed in each of the actuating levers 370. Each bearing notch 978 is designed to engage in a carriage lever 484. For the sectional views of FIGS. 9A to 9E, the wireless switch 100 is notched along a plane, which extends normal in relation to a base plate of the housing 110 and through a longitudinal axis of the movable carriage 482, as well as the tension spring 486.

Figure 9A:
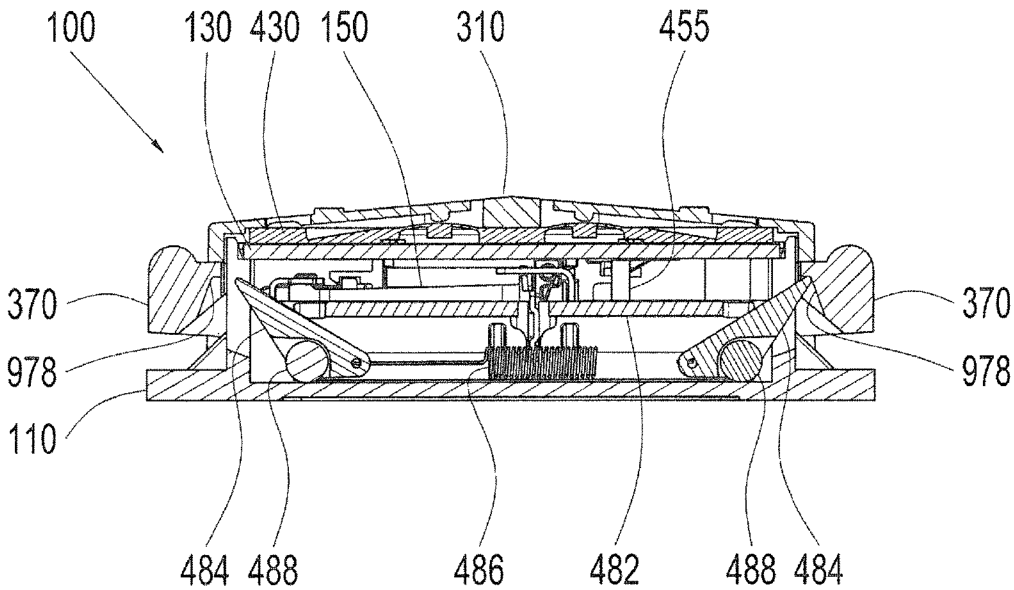
FIG. 9A to 9E are sectional views of the wireless switch shown in FIG. 3, FIG. 4 and FIG. 6 in different conditions during switching operations.

FIG. 9A shows the wireless switch 100 in an unactuated condition or in a rest position in the absence of an actuating force exerted on the wireless switch and thus prior to or following a switching operation. In their rest position, the actuating levers 370 are arranged at a distance from the base plate of the housing 110. In the representation of FIG. 9A, the switching means, which comprise the movable carriage 482, the carriage levers 484, the tension spring 486 and the rollers 488, are transferred from a central position to the right inside the housing 110. For example, the movable carriage 482 is arranged in the first position. The carriage lever 484 shown on the right in FIG. 9A is engaged in the bearing notch 978 of the actuating lever 370 shown on the right. The carriage lever 484 shown on the left in FIG. 9A is disengaged from the bearing notch 978 of the actuating lever 370 shown on the left. The carriage levers 484 are in a rest position.

Figure 9B:
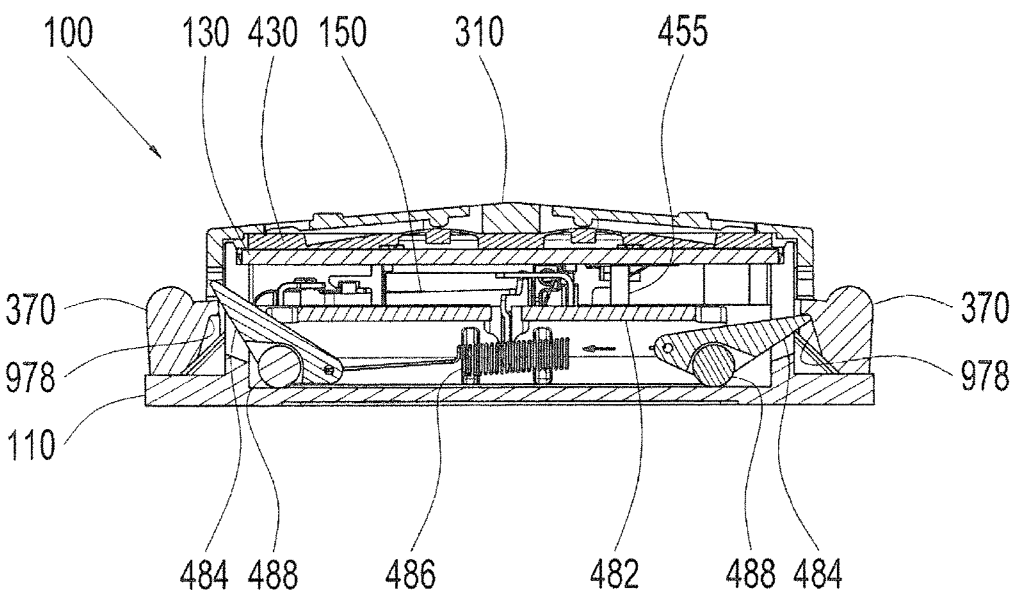

FIG. 9B shows the wireless switch 100 in a completely actuated condition when an actuating force is applied during a switching operation. Here, the actuating levers 370 are attached at the base plate of the housing 110 and arranged in a position of deflection. In the representation of FIG. 9B, the switching means are transferred from a central position to the left inside the housing 110. At the same time, the movable carriage 482 is arranged, for example, in the second position. The carriage lever 484 shown on the right in FIG. 9B is engaged in the bearing notch 978 of the actuating lever 370 shown on the right and arranged in a position of deflection. The carriage lever 484 shown on the left in FIG. 9B is disengaged from the bearing notch 978 of the actuating lever 370 shown on the left. The carriage lever 484 shown on the left in FIG. 9B is in a rest position.

Figure 9C:
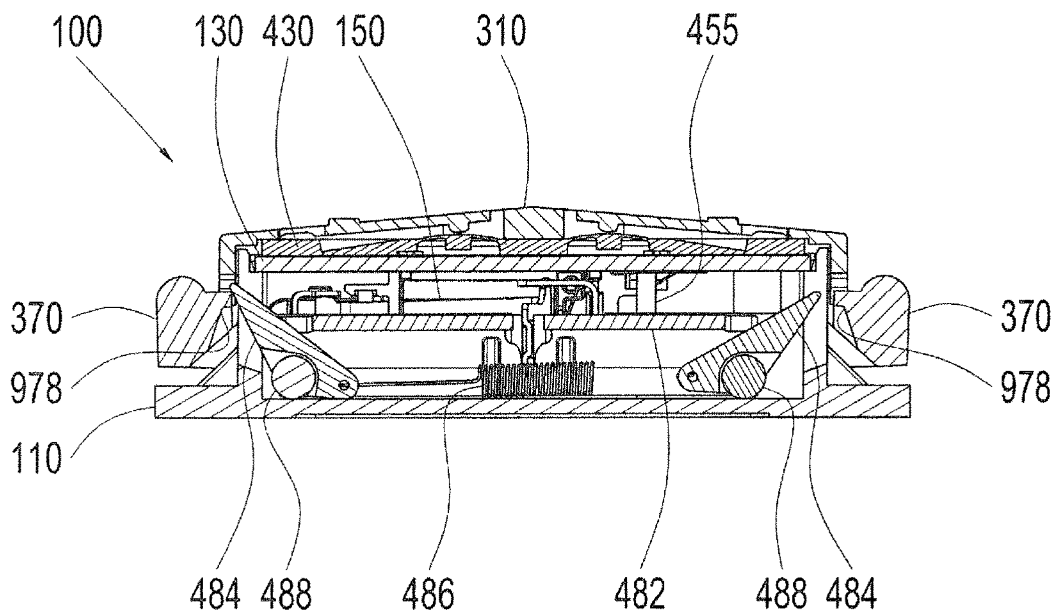

FIG. 9C shows the wireless switch 100 toward the end of a switching operation without applied actuating force. Here, the actuating levers 370 are arranged between their position of deflection and in a rest position. The movable carriage 482 is arranged in the second position. The carriage levers 484 are disengaged from the bearing notches 978 of the actuating levers 370. The carriage levers 484 are in a rest position.

Figure 9D:
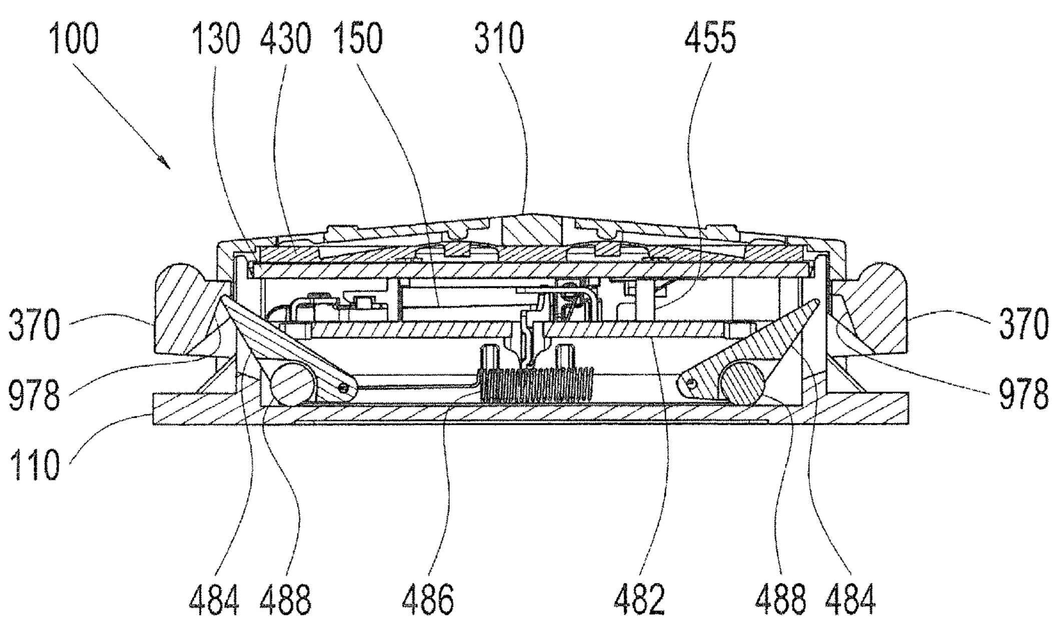

FIG. 9D shows the wireless switch 100 in an unactuated condition or a rest position in the absence of an actuating force exerted on the wireless switch following a switching operation of FIGS. 9A to 9C. Here, the actuating levers 370 are arranged in their rest position at a distance from the base plate of the housing 110. In the representation of FIG. 9D, the switching means are transferred from a central position to the left inside the housing 110. At the same time, the movable carriage 482 is arranged in the second position. The carriage lever 484 shown on the left in FIG. 9C is engaged in the bearing notch 978 of the actuating lever 370 shown on the left. The carriage lever 484 shown on the right in FIG. 9C is disengaged from the bearing notch 978 of the actuating lever 370 shown on the right. The carriage levers 484 are in a rest position.

Figure 9E:
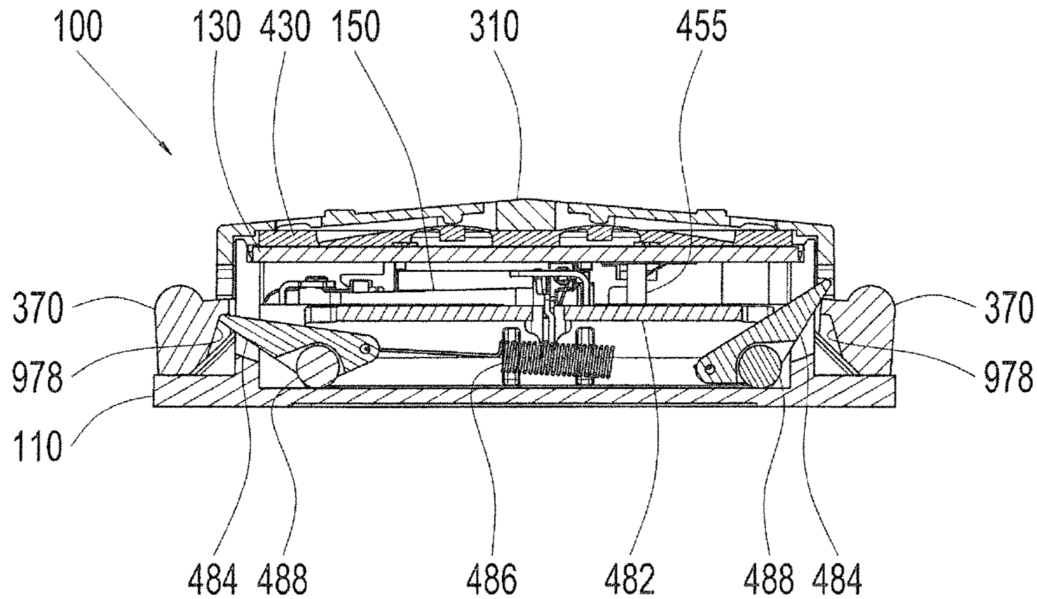

FIG. 9E shows the wireless switch 100 in in a completely actuated condition when an actuating force is applied during a further switching operation. Here, the actuating levers 370 are attached at the base plate of the housing 110 and arranged in a position of deflection. In the representation of FIG. 9E, the switching means are transferred from a central position to the right inside the housing 110. At the same time, the movable carriage 482 is arranged in the first position. The carriage lever 484 shown on the left in FIG. 9E is engaged in the bearing notch 978 of the actuating lever 370 shown on the left and arranged in a position of deflection. The carriage lever 484 shown on the right in FIG. 9E is disengaged from the bearing notch 978 of the actuating lever 370 shown on the right. The carriage lever 484 shown on the right in FIG. 9E is in a rest position.

Subsequently, with reference to FIGS. 9A to 9E, an actuation process of the wireless switch 100 is again summarized with a different description.

When moving the carriage 482 from one end position to the other end position, the energy conversion device 150 is activated in the one or other direction. The carriage 482 is provided on both sides with the carriage levers 484, which are selectively provided with the rollers 488 or, alternatively, with the sliding components for reducing friction forces. In a different embodiment, it is possible to eliminate the rollers 488 for financial reasons. Alternatively, a sliding component could be used instead of the roller 488, for example, a sliding plate or a sliding block or, in general, an element with a sliding surface. As a result, the carriage 482 could be designed in a structurally simple and cost-effective manner. Both carriage levers 484 are connected by means of the tension spring 486, which is placed in an interior hollow space of the movable carriage 482, and which is held in a neutral position or rest position, so that they can perform a clockwise and counter-clockwise rotational movement, at least in a specific angular range. The carriage levers 484 can be returned to their rest position by means of the tension spring.

In an assembled condition of the wireless switch 100, and when the wireless switch 100 is actuated, the switching means are, or the "toggle mechanism" is, transferred in one of two positions or end positions inside the housing 110, in the one or other direction, because of the bistable mechanical properties of the energy conversion device 150. At the same time, one of the two carriage levers 484 is in an engagement position.

When actuating the actuating lever 370 or the twin lever, an engaged carriage lever 484 is picked up by a bearing notch 978 of an actuating lever and transferred into a rotational movement. At the same time, the carriage 482 is moved in linear manner to its second position and activates or actuates the energy conversion device 150. After switching the energy conversion device 150 in this way, the movable carriage 482 is arranged in the second position.

A reset of the actuating lever 370 is performed by means of the return spring of the wireless switch 100. When releasing the actuating lever 370, the previously engaged carriage lever 484 abandons the bearing notch 978 of the respective actuating lever 370 and is put into its neutral position or rest position by means of the tension spring 486. In a further reset movement of the actuating levers 370, the bearing notch 978 of the opposite actuating lever 370 deflects the other carriage lever 484 in the opposite direction and lets the bearing notch 978 of the actuating lever 370 pass. Shortly before the rest position of the actuating lever 370, the other carriage lever 484 is released and reset to its rest position. Now, the other carriage lever 484 is engaged. In a subsequent actuation of the actuating lever 370, the movable carriage 482 is reset and again activates the energy conversion device 150. Thus, the movable carriage 482 or energy conversion device 150 completes with each further actuation a switching movement or so-called toggle movement.

For example, in an assembled or mounted condition of the wireless switch 100, the switch or light switch rocker is swivel-mounted on a rotational axis of the cover 110 and stands in a central position. When actuating the switch on the one or other direction, a primary actuator pin of the switch activates one of the actuating levers 370. In addition, at least one secondary actuator pin of the switch activates at least one of the code contacts before the energy conversion device 150 is actuated or activated. After activating the energy conversion device 150, electronics of the circuit carrier 130 are supplied with energy and, corresponding to the previously actuated code contact, a respective coded radio telegram or switching signal is produced. When releasing the switch, the at least one code contact is switched back. In the process, the energy conversion device 150 is activated.

This property can be used to produce two different switching signals when the same switch is actuated. According to the preceding description, the switching signal is not produced immediately during the actuation, but only after a measurement of a time interval between closing and opening he at least one code contact. For example, in a time interval shorter than 100 milliseconds, a first switching signal is produced and transmitted. When the time interval is exceeded, a second switching signal, which is different from the first switching signal, is transmitted. For example, this property can be used to differentiate between a simple action of turning on the light and the start of a dimming process. For example, when pressing the button briefly, the lamp is immediately switched to full power. When pressing the button for a longer period of time, the brightness is increased. For example, when pressing the button in opposite direction, a stop signal for the dimming process is produced.

Figure 10:
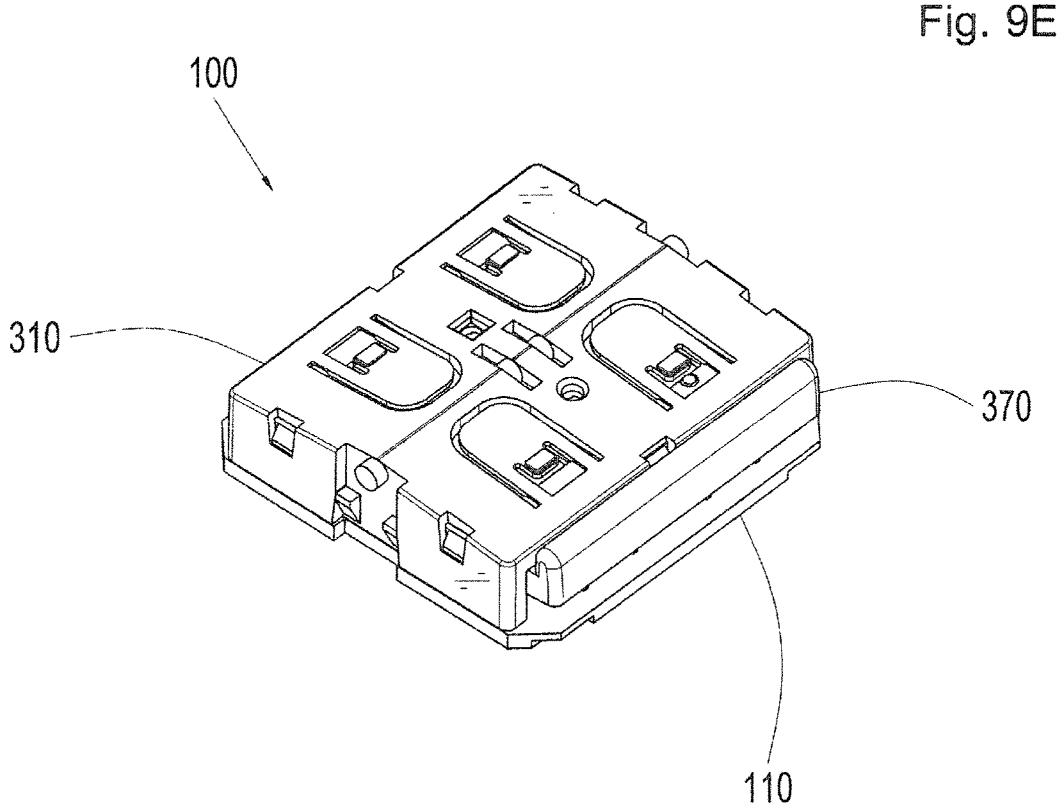
FIG. 10 is a perspective view of a wireless switch according to a further embodiment of the present invention.

FIG. 10 shows a perspective view of a wireless switch 100 according to a further embodiment of the present invention. The parts from the wireless switch 100 shown include a housing 110 or housing base, a cover 310 or housing cover and an actuating lever 370. The wireless switch 100 corresponds to the wireless switch shown in FIG. 3, FIG. 4, FIG. 6 or FIGS. 9A to 9E, with the exception that the wireless switch 100 of FIG. 10 is designed in the form of a one-way module having only one actuating lever 370. Subsequently, with reference to FIGS. 11 to 12D, differences between the wireless switch 100 according to the embodiment shown in FIG. 10 of the present invention and the wireless switch show in FIG. 3, FIG. 4, FIG. 6 or FIGS. 9A to 9E are described in more detail.

Figure 11:
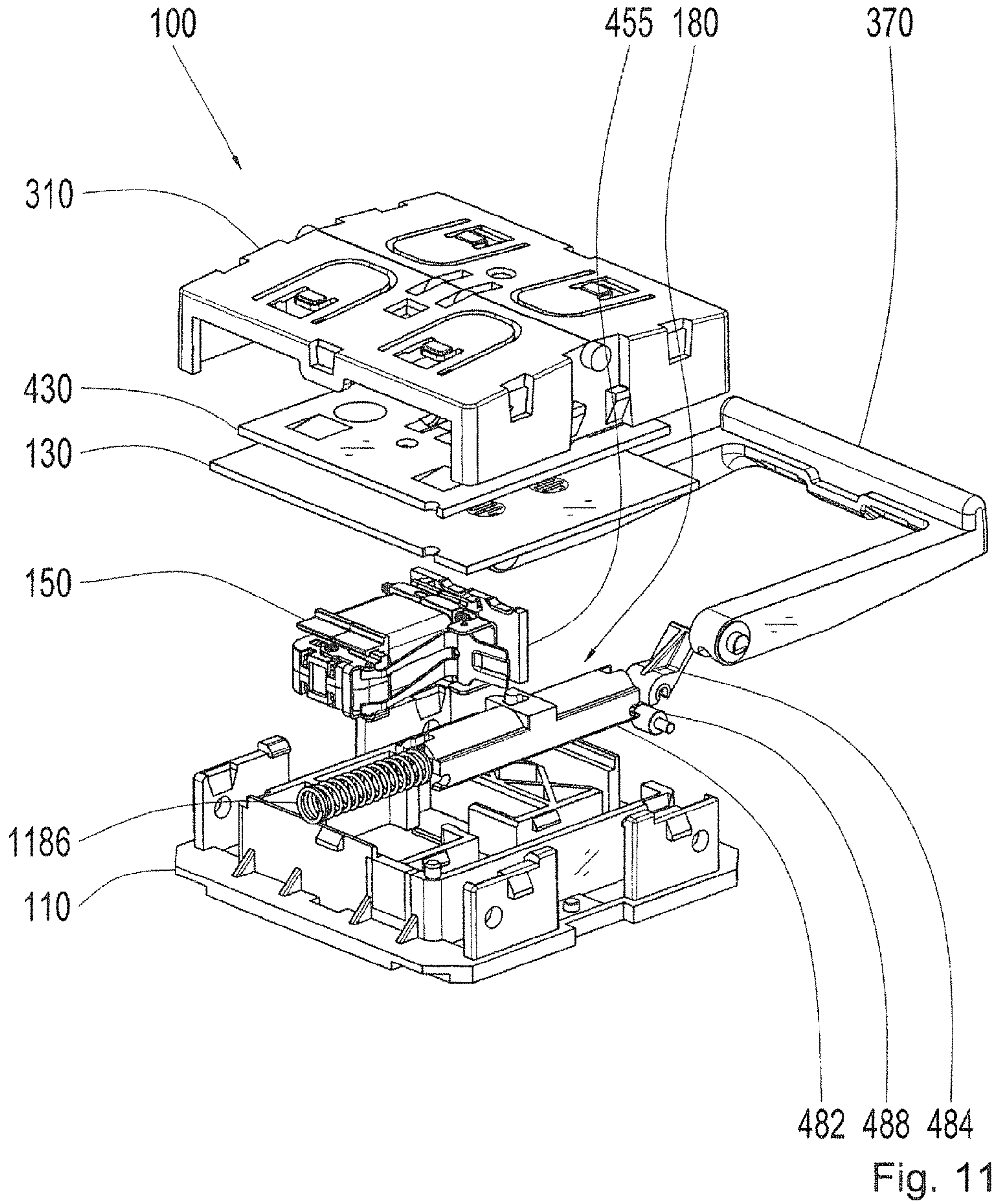
FIG. 11 is a perspective view of an exploded diagram of the wireless switch shown in FIG. 10.

FIG. 11 shows a perspective view of an exploded diagram of the wireless switch 100 shown in FIG. 10. The parts from the wireless switch 100 shown include the housing 110, the circuit carrier 130, the energy conversion device 150, the witching means 180, the cover 310, the actuating lever 370, the switch membrane 430, the auxiliary circuit board 455, the movable carriage 482, a carriage lever 484, a roller 488 and a compression spring 1186. FIG. 11 shows that, in contrast to the wireless switch shown in FIG. 3, FIG. 4, FIG. 6 or FIGS. 9A to 9E, the wireless switch 100 comprises merely an actuating lever 370, which is here designed without an elongated hole and a pin, merely a carriage lever 484, merely a roller 488 and, instead of the tension spring, the compression spring 1186. Furthermore, according to FIG. 11 the auxiliary circuit board 455 is electrically and mechanically connected with the energy conversion device 150. The compression spring 1186 can be received in the movable carriage 482 and can be arranged between the carriage lever 484 and a sidewall of the housing 110.

In other words, by changing the assembly, it is possible to change in a cost-effective manner a function of the wireless switch 100 with regard to the switch of FIG. 3, FIG. 4, FIG. 6 or FIGS. 9A to 9E, by changing a few components. This process eliminates the twin lever, a carriage lever, a roller, the tension spring and the reset spring of the wireless switch of FIG. 3, FIG. 4, FIG. 6 or FIGS. 9A to 9E. As described above, the roller 488 could be eliminated for financial reasons. Alternatively, it is possible to use a sliding component according to one of the embodiments described above instead of the roller. Instead of the twin lever, it is possible to use a simple actuating lever 370, for example, with a raised cam. For example, the carriage lever 484 mounted on the movable carriage 482 is extended in relation to FIG. 3, FIG. 4, FIG. 6 or FIGS. 9A to 9E and is continuously engaged in the bearing notch of the actuating lever 370. A reset of the switching means 180 is performed by means of the compression spring 1186, which is preloaded in the hollow space of the carriage 482 between the carriage 482 and a sidewall of the housing 110. When actuating the wireless switch 100, the energy conversion device 150 is activated and a mechanical energy is stored for a downshift process in the compression spring 1186. When releasing the switch, the compression spring 1186 resets the switching means 180 and activates a downshift of the energy conversion device 150.

Even the wireless switch 100 configured as a one-way module can be operated with a rocker, double rocker or multiple rocker. With a simple reconstruction, it is possible to implement a cost-effective variety of wireless switches 100. The further processes and sequences are similar to the wireless switch configured as a two-way module and escribed in FIG. 3, FIG. 4, FIG. 6 or FIGS. 9A to 9E.

Figure 12A:
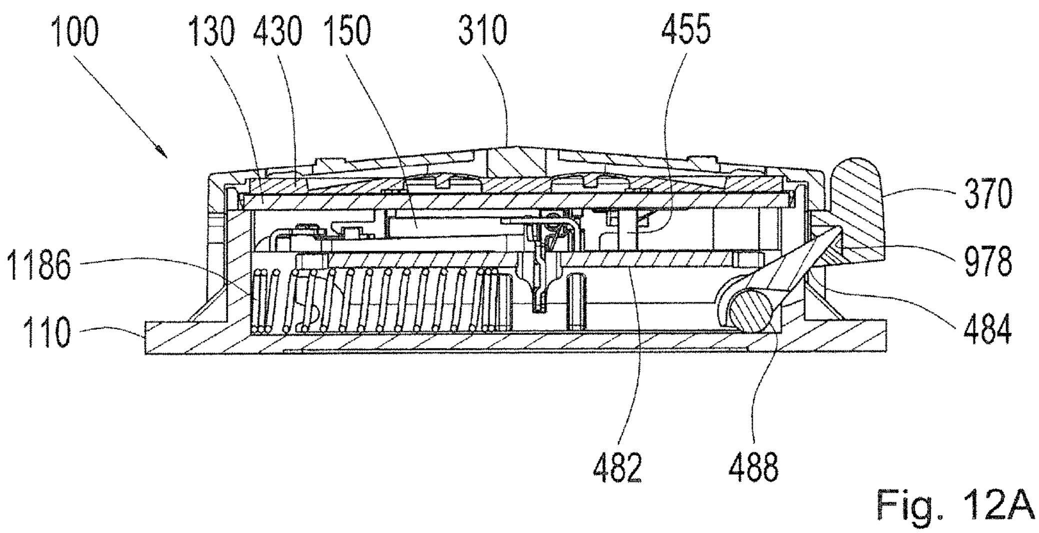
FIG. 12A to 12D are sectional views and top views of the wireless switch shown in FIG. 10 and FIG. 11 in different conditions during a switching operation.
Figure 12B:
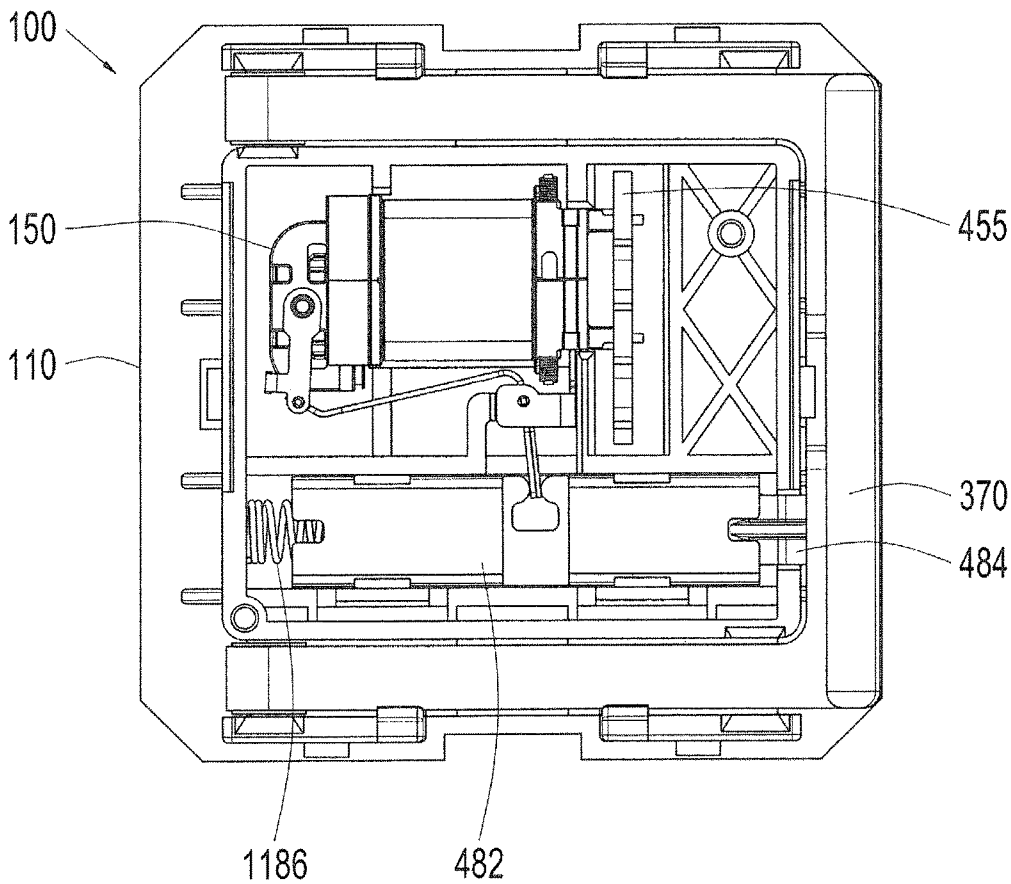
Figure 12C:
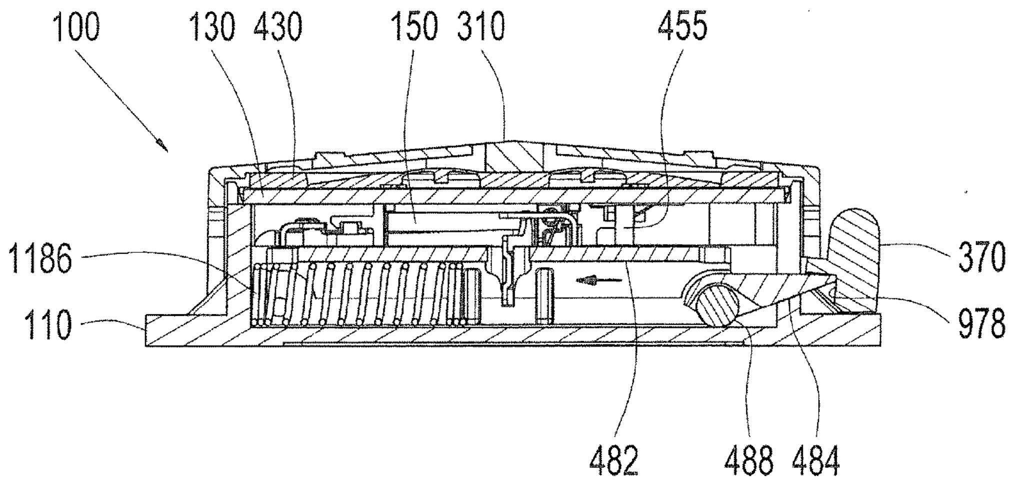
Figure 12D:
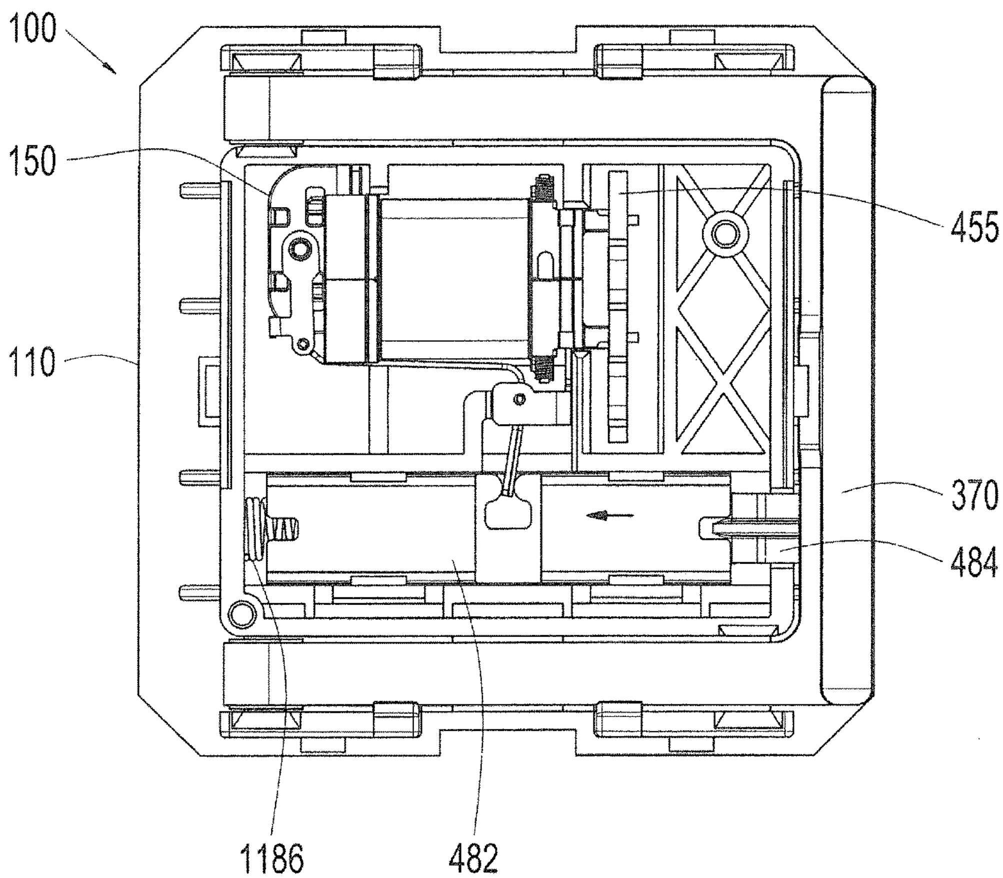

FIGS. 12A to 12D show sectional views and top views of the wireless switch 100 shown in FIG. 10 to FIG. 11 in different conditions during a switching operation. FIG. 12A and FIG. 12C show sectional views of the wireless switch 100, whereas FIG. 12B and FIG. 12D show top views of the wireless switch 100.

Due to display limitations, the sectional views of FIGS. 12A and 12C respectively show from the wireless switch 100 the housing 110, the circuit carrier 130, the energy conversion device 150, the cover 310, the actuating lever 370, the switch membrane 430, the auxiliary circuit board 455, the movable carriage 482, the carriage lever 484, the roller 488, a bearing notch 978 and the compression spring 1186. The bearing notch 978 is formed in the actuating lever 370. The bearing notch 978 is designed to be engaged in the carriage lever 484. For the sectional views of FIGS. 12A and 12C, the wireless switch 100 is notched along a plane, which extends normal in relation to a base plate of the housing 110 and through a longitudinal axis of the movable carriage 482, as well as the tension spring 1186.

Due to display limitations, the top views of FIGS. 12B and 12D respectively show form the wireless switch 100 the housing 110, the energy conversion device 150, the actuating device 370, the auxiliary circuit board 455, the movable carriage 482, the carriage lever 484 and the compression spring 1186. In den top views of FIGS. 12B and 12D the wireless switch 100 is provided without the circuit carrier, the switching device and the cover, wherein the roller and the bearing notch are covered in the top views.

FIG. 12A shows the wireless switch 100 in an unactuated condition or a rest position in the absence of an actuating force exerted on the wireless switch and thus prior to or following a switching operation. Here, the actuating lever 370 is arranged in a rest position at a distance from a base plate of the housing 110. In der representation of FIG. 12A, the switching means, which comprise the movable carriage 482, the carriage lever 484, the roller 488 and the compression spring 1186 are transferred from a central position to the right inside the housing 110. For example, the movable carriage 482 is arranged in the first position. The carriage lever 484, shown on the right in FIG. 12A, is engaged in the bearing notch of the actuating lever 370 shown on the right. Here, the carriage lever 484 is arranged in the rest position. The compression spring 1186 is in an uncompressed condition. FIG. 12B shows a top view of the wireless switch 100 in the condition shown in FIG. 12A.

FIG. 12C shows the wireless switch 100 sown in FIG. 12A in a completely actuated condition during a switching operation. Here, the actuating lever 370 is arranged in a position of deflection, attached to the base plate of the housing 110. In the representation of FIG. 12C, the switching means are transferred from a central position to the left inside the housing 110. For example, the movable carriage 482 is arranged in the second position. The carriage lever 484 is engaged in the bearing notch 978 of the actuating lever 370 and in a position of deflection. The compression spring 1186 is in a tense or compressed condition. FIG. 12D shows a top view of the wireless switch 100 in the condition shown in FIG. 12C.

Subsequently, with reference to FIGS. 12A to 12D, an actuation process of the wireless switch 100 is again summarized with a different description. A button used as an actuating rocker of the wireless switch 100 can be arranged in an inclined rest position and is to be actuated, for example, merely in one spot or one direction. For functionality reasons, it can be required to produce an electrical energy impulse even when releasing the button and to transmit a second switching signal, for example, in order to perform a dimming process or control a shutter. At the same time, in comparison to the wireless switch shown in FIG. 3, FIG. 4, FIG. 6 and FIGS. 9A to 9E and designed in the form of a two-way module, an actuating force to be applied can remain basically the same. This is possible by adjusting level ratios of the actuating lever 370 and the carriage lever 484. In the wireless switch 100 shown in FIG. 10, FIG. 11 and FIGS. 12A to 12D, an entire rocking movement of a button from one inclined position to another inclined position, i.e., a full cycle, can be used for producing two energy impulses, whereas in the wireless switch shown in FIG. 3, FIG. 4, FIG. 6 and FIGS. 9A to 9E, two half-cycles are used for producing two electrical energy impulses which, for example, results in the same energy balance.

Figure 13:
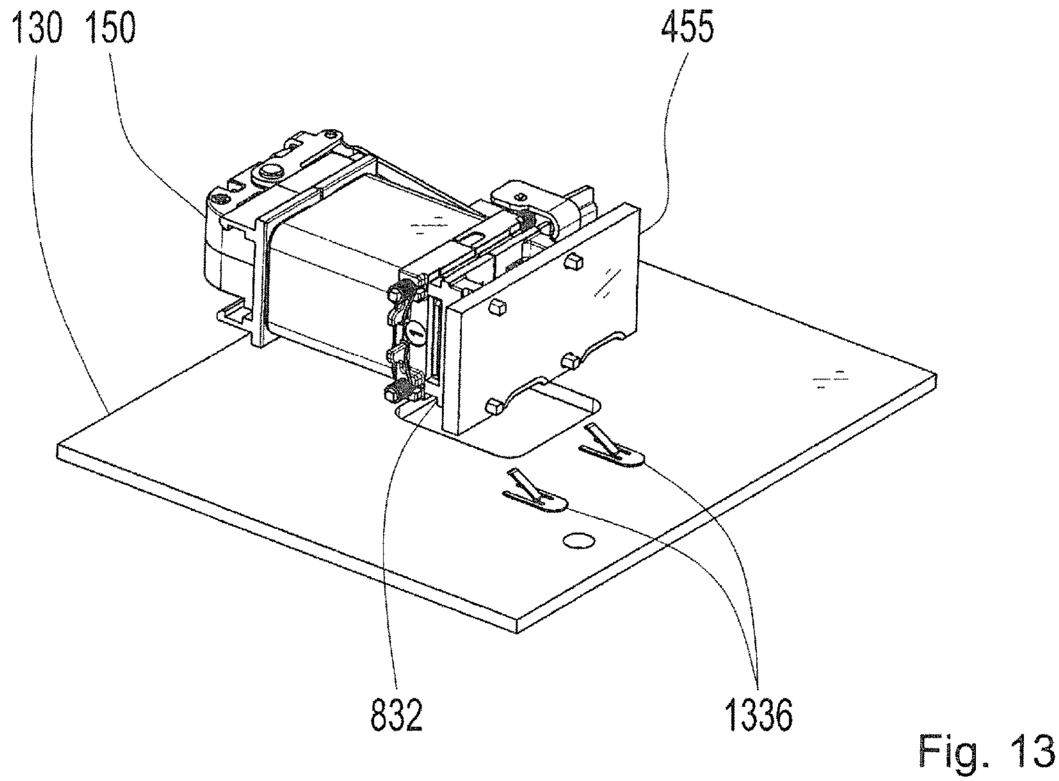
FIGS. 13 and 14 are perspective views of an energy conversion device and a circuit carrier of the wireless switch shown in FIG. 3, FIG. 4, FIG. 6 and FIGS. 9A to 9E or FIG. 10, FIG. 11 and FIGS. 12A to 12D according to embodiments of the present invention.

FIG. 13 shows a perspective view of an energy conversion device and a circuit carrier of the wireless switch shown in FIG. 3, FIG. 4, FIG. 6 and FIGS. 9A to 9E or FIG. 10, FIG. 11 and FIGS. 12A to 12D according to an embodiment of the present invention. The parts shown include the circuit carrier 130, the energy conversion device 150, the auxiliary circuit board 455, the through-hole 832 and SMD spring contacts 1336 or surface attachment contacts. From the circuit carrier 130, especially a main surface is shown, which faces the energy conversion device 150 in mounted condition of the wireless switch. In the representation of FIG. 13, the auxiliary circuit board 455 is electrically and mechanically connected with the energy conversion device 150. The through-hole 832 is arranged in the center of the circuit carrier 130. For example, the circuit carrier 130 involves the circuit carrier shown in FIG. 8. The SMD spring contacts 1336 are arranged on the main surface of the circuit carrier 130. The SMD spring contacts 1336 are designed to produce an electrically conductible connection between the circuit carrier 130 and the energy conversion device 150 or to allow for such a connection. As a result, an electrical contact can be made by means of the SMD spring contacts 1336 between the circuit carrier 130 and the auxiliary circuit board 455.

Figure 14:
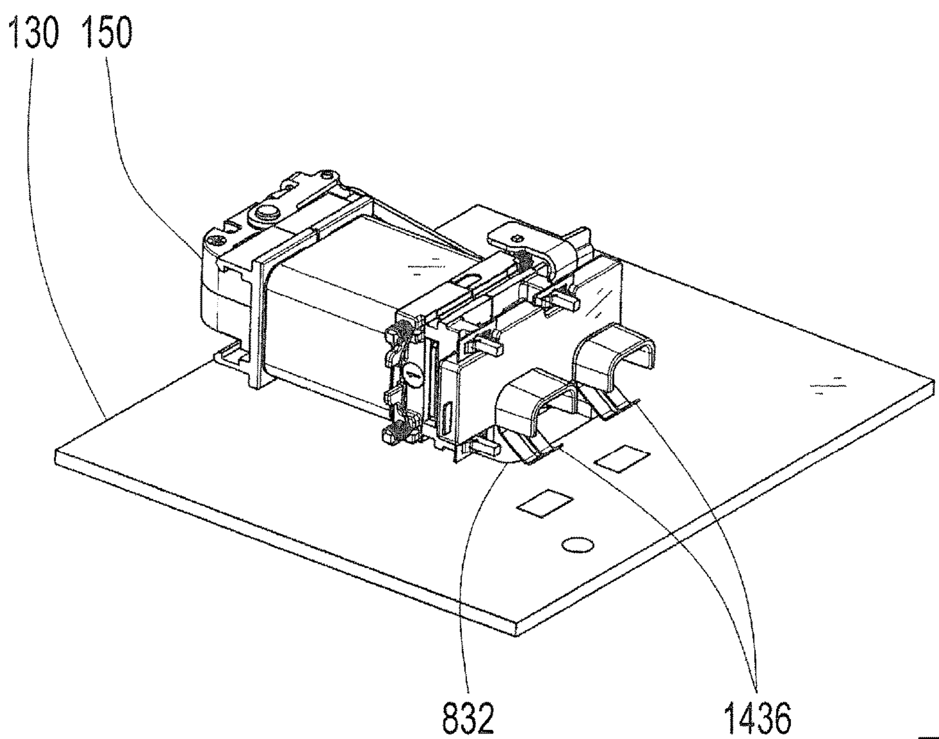

FIG. 14 shows a perspective view of an energy conversion device and a circuit carrier of the wireless switch shown in FIG. 3, FIG. 4, FIG. 6 and FIGS. 9A to 9E or FIG. 10, FIG. 11 and FIGS. 12A to 12D according to an embodiment of the present invention. The parts shown include the circuit carrier 130, the energy conversion device 150, the through-hole 832 and metal grid spring contacts 1436. From the circuit carrier 130, especially a main surface is shown, which faces the energy conversion device 150 in mounted condition of the wireless switch. In the representation of FIG. 14, the auxiliary circuit board is eliminated. The through-hole 832 is arranged in the center of the circuit carrier 130. For example, the circuit carrier 130 involves the circuit carrier shown in FIG. 8. Here, the circuit carrier 130 is designed in the form of a coated metal grid. The metal grid spring contacts 1436 are arranged on the main surface of the circuit carrier 130. The metal grid spring contacts 1436 are designed to produce an electrically conductible connection between the circuit carrier 130 and the energy conversion device 150 or to allow for such a provision. As a result, a direct electrical contact can be made between the circuit carrier 130 and the energy conversion device 150 by means of the metal grid spring contacts 1436. Thus, it is possible to eliminate the auxiliary circuit board and the associated costs for soldering. This can involve another cost advantage and increase the reliability of the contact.

The embodiments described and shown in the figures are used only for exemplary purposes. Different embodiments can be combined with one another completely or with respect to individual properties. It is also possible to supplement an embodiment with properties from a different embodiment. Furthermore, it is possible to repeat invention-based procedural steps or perform these in a different sequence than the one described.

If an embodiment comprises an "and/or" connection between a first property and a second property, this may be read in such a way that the design example according to one embodiment comprises the first property, as well as the second property and, according to a further embodiment, only the first property or only the second property.

REFERENCE NUMBERS

100 wireless switch
110 housing
120 switch/button
130 circuit carrier
140 signal output device
150 energy conversion device
160 switching device
170 actuating means
180 switching means
F actuating force or introduction of mechanical energy
200 method for producing
210 step of generating
220 step of releasing
310 cover
370 actuating lever
430 pressure-sensitive mat or switch membrane
455 contact plate or auxiliary circuit board
472 elongated hole
474 pin
476 reset spring
482 movable carriage
484 carriage lever
486 tension spring
488 roller
832 through-hole
834 code contact
978 bearing notch
1186 compression spring
1336 SMD spring contact
1436 metal grid spring contact

What is claimed is:

1. A switching device for a wireless switch comprising:
an actuating mechanism configured to receive mechanical energy introduced into the switching device during a switching operation;
a switching mechanism mechanically connectible to the actuating mechanism that is actuated during the switching operation;
an energy conversion device mechanically connectible to the switching mechanism configured to convert the mechanical energy to an electrical energy; and
a circuit carrier electrically connected to the energy conversion device that includes:
a signal output device with radio electronics for transmitting a switching signal; and
at least one code contact that is actuated during the switching operation to provide a code signal;
wherein when the switching mechanism is connected to the energy conversion device, the energy conversion device transitions from a first stable condition to a second stable condition different from the first stable condition to thereby produce at least one electrical energy impulse.

2. The switching device of claim 1, wherein the switching mechanism comprises a movable carriage, which can be mechanically connected with the energy conversion device, and at least one carriage lever, which can be actuated by the actuating mechanism, wherein the at least one carriage lever is designed to move the movable carriage between a first position, which is assigned to the first stable condition of the energy conversion device, and a second position, which is assigned to the second stable condition of the energy conversion device.

3. The switching device of claim 2, wherein the switching device further comprises at least one roller or one sliding component, which can be mechanically connected with the movable carriage and/or with the at least one carriage lever.

4. The switching device of claim 2, wherein the switching mechanism further comprises a spring that effects the movable carriage to move the movable carriage from the second to the first position.

5. The switching device of claim 2, wherein the switching mechanism comprises a spring and two carriage levers, wherein the spring preloads the carriage levers in a rest position, wherein the movable carriage is arranged between the carriage levers, wherein a first carriage lever moves the movable carriage from the first position to the second position, wherein a second carriage lever moves the movable carriage from the second position to the first position.

6. A wireless switch comprising:
a switching device comprising an actuating mechanism for receiving a mechanical energy introduced into the switching device during a switching operation, wherein the switching device with the actuating mechanism and with an energy conversion device comprises a mechanically connectible switching mechanism;
wherein the energy conversion device converts the mechanical energy to the electrical energy for transmitting a switching signal;
a circuit carrier electrically connected to the energy conversion device that includes:
a signal output device with radio electronics for transmitting the switching signal; and
at least one code contact that is actuated during the switching operation to provide a code signal;
a housing comprising at least one housing element, wherein the housing receives the switching device, the energy conversion device and the circuit carrier; and
a button for transmitting the mechanical energy to the actuating mechanism of the switching device; wherein the button is attached on the housing.

7. The wireless switch of claim 6, wherein the button comprises the form of a rocker, a double rocker or a multiple rocker.

8. The wireless switch of claim 6, wherein the housing is partially formed from a sound-decoupling material for reducing an operational noise and/or the wireless switch comprises a sound-decoupling capsule for absorbing the sound of the energy conversion device.

9. A method for producing a wireless signal from a switch, the method comprising:
providing:
an actuating mechanism configured to receive mechanical energy introduced into the switch during a switching operation;

a switching mechanism mechanically connectible to the actuating mechanism that is actuated during the switching operation;

an energy conversion device mechanically connectible to the switching mechanism configured to convert the mechanical energy to an electrical energy; and a circuit carrier electrically connected to the energy conversion device that includes:

a signal output device with radio electronics for transmitting a switching signal; and at least one code contact that is actuated during the switching operation to provide a code signal;

receiving mechanical energy via the actuating mechanism during a switching operation;

in response to receiving the mechanical energy, transitioning the energy conversion device from a first stable condition to a second stable condition different from the first stable condition to thereby generate at least one electrical energy impulse;

powering the signal output device using the at least one electrical energy impulse; and wirelessly communicating, by the powered signal output device, the wireless switching signal.

10. The switching device of claim 3, wherein the switching mechanism comprises a spring, which are designed to have an effect on the movable carriage, in order to move the movable carriage from the second to the first position.

11. The switching device of claim 2, wherein the switching mechanism comprises a spring and two carriage levers, wherein the spring preloads the carriage levers in a rest position, wherein the movable carriage is arranged between the carriage levers, wherein a first carriage lever moves the movable carriage from the first position to the second position, wherein a second carriage lever moves the movable carriage from the second position to the first position.

12. The wireless switch device of claim 6, wherein the switching mechanism comprises a movable carriage, which can be mechanically connected with the energy conversion device, and at least one carriage lever, which can be actuated by the actuating mechanism, wherein the at least one carriage lever is designed to move the movable carriage between a first position, which is assigned to the first stable condition of the energy conversion device, and a second position, which is assigned to the second stable condition of the energy conversion device.

13. The wireless switch device of claim 12, wherein the switching device further comprises at least one roller or one sliding component, which can be mechanically connected with the movable carriage and/or with the at least one carriage lever.

14. The wireless switch device of claim 12, wherein the switching mechanism further comprises a spring that effects the movable carriage to move the movable carriage from the second to the first position.

15. The wireless switch device of claim 12, wherein the switching mechanism further comprises a spring and two carriage levers, wherein the spring preloads the carriage levers in a rest position, wherein the movable carriage is arranged between the carriage levers, wherein a first carriage lever moves the movable carriage from the first position to the second position, wherein a second carriage lever moves the movable carriage from the second position to the first position.

16. The wireless switch device of claim 13, wherein the switching mechanism further comprises a spring that effects the movable carriage to move the movable carriage from the second to the first position.

17. The wireless switch of claim 7, wherein the button comprises the form of a rocker, a double rocker or a multiple rocker.

18. The wireless switch of claim 6, wherein the housing is partially formed from a sound-decoupling material for reducing an operational noise and/or the wireless switch comprises a sound-decoupling capsule for absorbing the sound of the energy conversion device.

19. The wireless switch of claim 7, wherein the housing is partially formed from a sound-decoupling material for reducing an operational noise and/or the wireless switch comprises a sound-decoupling capsule for absorbing the sound of the energy conversion device.

* * * * *